United States Patent
Aso et al.

(10) Patent No.: US 7,304,868 B2
(45) Date of Patent: Dec. 4, 2007

(54) DC CONVERTER

(75) Inventors: Shinji Aso, Niiza (JP); Mamoru Tsuruya, Niiza (JP); Makoto Sato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 45 days.

(21) Appl. No.: 11/355,166

(22) Filed: Feb. 16, 2006

(65) Prior Publication Data
US 2006/0193155 A1    Aug. 31, 2006

(30) Foreign Application Priority Data
Feb. 25, 2005    (JP)    ............... P2005-051706

(51) Int. Cl.
*H02M 3/335*    (2006.01)
(52) U.S. Cl. .................... 363/21.06; 363/21.08
(58) Field of Classification Search ............ 363/21.06, 363/21.08, 21.09
See application file for complete search history.

(56) References Cited
U.S. PATENT DOCUMENTS
5,991,171 A * 11/1999 Cheng .................... 363/21.03
FOREIGN PATENT DOCUMENTS
JP    3159261    2/2001

OTHER PUBLICATIONS
U.S. Appl. No. 11/302,184, filed Dec. 14, 2005, Tsuruya et al.
U.S. Appl. No. 11/320,640, filed Dec. 30, 2005, Aso et al.
U.S. Appl. No. 11/355,166, filed Feb. 16, 2006, Aso et al.
U.S. Appl. No. 11/357,161, filed Feb. 21, 2006, Aso et al.
U.S. Appl. No. 11/369,871, filed Mar. 8, 2006, Aso et al.

* cited by examiner

*Primary Examiner*—Shawn Riley
(74) *Attorney, Agent, or Firm*—Oblon, Spivak, McClelland, Maier & Neustadt, P.C.

(57) ABSTRACT

A DC converter has a transformer with loosely coupled primary and secondary windings, a main switch connected in series with the primary winding of the transformer, and a series circuit connected to ends of one of the primary winding and main switch. The series circuit includes a clamp capacitor and an auxiliary switch. The main and auxiliary switches are alternately turned on/off so that a voltage of the secondary winding of the transformer is synchronously rectified with synchronous rectifiers and is smoothed with smoothing elements, to provide a DC output. The DC converter also includes a tertiary winding tightly coupled with the primary winding of the transformer, a voltage source to supply a voltage lower than a voltage generated by the tertiary winding of the transformer, and clamp diodes to clamp the voltage generated by the tertiary winding with the use of the voltage source. The clamp diodes provide voltage-clamped signals to drive the synchronous rectifiers.

10 Claims, 14 Drawing Sheets

RELATED ART

DC CONVERTER

BACKGROUND OF THE INVENTION

1. Field of the Invention

The present invention relates to a highly efficient DC (direct current) converter.

2. Description of the Related Art

FIG. 1 is a circuit diagram showing a DC converter according to a related art. The DC converter shown in FIG. 1 is a forward converter provided with active clamps. The DC converter includes a DC power source Vin and a main switch Q1 such as a MOSFET (field effect transistor) connected to the DC power source Vin through a primary winding P1 (having the number of turns of n1) of a transformer Ta.

Ends of the primary winding P1 are connected Tao series circuit that consists of an auxiliary switch Q2 such as a MOSFET and a clamp capacitor C2. The series circuit consisting of the switch Q2 and clamp capacitor C2 forms an active clamp circuit, which may be connected in parallel with the switch Q1.

A diode D1 is connected between the drain and source of the switch Q1, and a diode D2 is connected between the drain and source of the switch Q2. The diodes D1 and D2 may be parasitic diodes of the switches Q1 and Q2 if the switches Q1 and Q2 are MOSFETs containing the parasitic diodes. A capacitor C3 is a voltage resonance capacitor and is connected between the drain and source of the switch Q1. The capacitor C3 may be a parasitic capacitance of the switch Q1.

The switches Q1 and Q2 have a dead time during which they are both turned off by a control circuit 11. The control circuit 11 conducts PWM control to alternately turn on/off the switches Q1 and Q2.

The primary winding P1 and a secondary winding S1 (having the number of turns of n2) of the transformer Ta are wound to generate in-phase voltages. In FIG. 1, a filled circle represents a winding start of each of the primary winding P1 and secondary winding S1 of the transformer Ta.

A leakage inductance LS is produced between the primary winding P1 and the secondary winding S1 of the transformer Ta. Through the leakage inductance LS, a first end of the secondary winding S1 is connected to the cathode of a diode D10. A second end (indicated with the filled circle) of the secondary winding S1 is connected to the cathode of a diode D11. The anode of the diode D11 is connected to the anode of the diode D10.

The ends of the diode D10 are connected to the drain and source of a switch Q10, which may be a MOSFET serving as a synchronous rectifier for rectification. The ends of the diode D1 are connected to the drain and source of a switch Q11, which may be a MOSFET serving as a synchronous rectifier for current circulation. The gate of the switch Q10 is connected to the second end (indicated with the filled circle) of the secondary winding S1. The gate of the switch Q11 is connected through the leakage inductance LS to the first end of the secondary winding S.

The diodes D10 and D11 may be parasitic diodes of the switches Q10 and Q11 if the switches Q10 and Q11 are MOSFETs containing the parasitic diodes. The elements D10, D11, Q10, and Q11 form a synchronous rectifying circuit. The synchronous rectifying circuit rectifies voltage (on/off-controlled pulse voltage), which is generated by the secondary winding S1 of the transformer Ta in synchronization with on/off operation of the switch Q1, and outputs the rectified voltage.

The ends of the diode D10 are connected to a series circuit including a resistor R20 and a capacitor C20. The ends of the diodes D11 are connected to a series circuit including a resistor R21 and a capacitor C21. These two series circuits are CR snubber circuits to attenuate surge voltage during recovery of the diodes D10 and D11.

The ends of the switch Q11 are connected in series with a smoothing reactor L1 (corresponding to a smoothing element) and a smoothing capacitor C10 (corresponding to a smoothing element), to form a smoothing circuit. The smoothing circuit smoothes the rectified output of the synchronous rectifying circuit and provides a DC output to a load 50.

Based on an output voltage of the load 50, the control circuit 11 generates a pulse control signal to turn on/off the switches Q1 and Q2, and at the same time, controls the duty factor of the control signal so as to bring the output voltage to a predetermined value.

The DC converter also includes a low-side driver 13 and a high-side driver 15. The low-side driver 13 applies a gate signal Q1g from the control circuit 11 to the gate of the switch Q1, to thereby drive the switch Q1. The high-side driver 15 applies a gate signal Q2g from the control circuit 11 to the gate of the switch Q2, to thereby drive the switch Q2.

Operation of the DC converter of the above-mentioned configuration will be explained with reference to a timing chart of FIG. 2. In FIG. 2, Q1g is a gate signal to the switch Q1, Q2g a gate signal to the switch Q2, Q1v a drain-source voltage of the switch Q1, Q1i a drain current of the switch Q1, Q2i a drain current of the switch Q2, C3i a current tote capacitor C3, Q10v a drain-source voltage of the switch Q10, D10i a current to the diode D10, Q10i a drain current of the switch Q10, Q11v a drain-source voltage of the switch Q11, D11i a current to the diode D11, and Q11i a drain current of the switch Q11.

Before t0, the switch Q1 is OFF and the switch Q2 ON. On the primary side of the transformer Ta, a current passes through a path along Q2, P1, C2, and Q2. The primary winding P1 of the transformer Ta receives a voltage VC2 from the clamp capacitor C2, and the potential of the winding end of the primary winding P1 is positive. Accordingly, a terminal voltage of the secondary winding S1 is expressed by VC2·(n2/n1) and the potential of the winding end of the secondary winding S1 is positive.

As a result, the voltage Q10v of the switch Q10 is equal to VC2·(n2/n1) and the gate voltage of the switch Q11 is expressed by VC2·(n2/n1) and is positive. This turns on the switch Q11. On the secondary side of the transformer Ta, a current passes through a route of L1, C10, Q11, and L1. The voltage Q11v is substantially zero and the switch Q10 is OFF.

At t0 of period T1, the switch Q2 changes from ON to OFF and the current passing through the path along Q2, P1, C2, and Q2 becomes zero. Instead, a current passes through a path along P1, Vin, C3, and P1, to discharge the capacitor C3 and drop the voltage Q1v of the switch Q1. When the voltage Q1v drops, the terminal voltage of the primary winding P1 decreases to decrease the terminal voltage of the secondary winding S1. This results in decreasing the voltage Q10v of the switch Q10.

At t1 of period T2, the voltage Q10v of the switch Q10 decreases to a gate threshold voltage Vth11 of the switch Q11, to turn off the switch Q11. The current Q11i of the switch Q11 becomes zero, and the current to the switch Q11 starts to pass through the diode D11.

At t2 of period T3, the voltage Q1v of the switch Q1 reaches the voltage of the DC power source Vin. The terminal voltage of the primary winding P1 becomes zero, and therefore, the terminal voltage of the secondary winding S1 becomes zero. This drops the voltage Q10v of the switch Q10 to zero. The voltage Q1v of the switch Q1 further decreases to apply positive potential to the winding start of the primary winding P1, and therefore, positive potential is applied to the winding start of the secondary winding S1. At t3, the voltage Q1v of the switch Q1 becomes zero. Then, the terminal voltage of the primary winding P1 becomes Vin and the terminal voltage of the secondary winding S1 becomes Vin·(n2/n1). In the period T3, the terminal voltage of the primary winding P1 changes from zero to Vin with the winding start of the primary winding P1 being positive. At this time, the terminal voltage of the secondary winding S1 changes from zero to Vin·(n2/n1) with the winding start of the secondary winding S1 being positive.

Accordingly, a current ILS(t) passing through the leakage inductance LS increases as following expression:

$$ILS(t) = (VS1(t)/LS) \cdot t \quad (1),$$

where VS1(t) is a terminal voltage of the secondary winding S1, LS is a leakage inductance value, and t is time. The current passing through the leakage inductance LS is equal to the current of the diode D10, and therefore, the current D10i of the diode D10 increases in the period T3. By an increment of the current D10i of the diode D10, the current D11i of the diode D11 decreases. During the period T3 on the secondary side of the transformer Ta, a current passes through a route of L1, C10, D11, and L1 and another current passes through a route of L1, C10, D10, LS, S1, and L1. The latter current increases according to the expression (1), and the former current decreases thereby.

At t3 of period T4, the capacitor C3 completely discharges, the voltage Q1v of the switch Q1 becomes zero, the current passing through the path along P1, Vin, C3, and P1 changes its direction to a path along P1, Vin, D1 (Q1), and P1, and the switch Q1 turns on in response to the gate signal Q1g.

In the period T4, the voltage Q1v of the switch Q1 is substantially zero and the terminal voltage of the primary winding P1 is Vin. The terminal voltage VS1(t) of the secondary winding S1, therefore, is expressed as Vin·(n2/n1). The current ILS(t) passing through the leakage inductance LS increases as following expression:

$$ILS(t) = (VS1(t)/LS) \cdot t + ILS(t3) \quad (2)$$
$$= (Vin \cdot (n2/n1)/LS) \cdot t + ILS(t3),$$

where ILS(t3) is a current passing through the leakage inductance LS at t3. By an increment of the current passing through the leakage inductance LS, the current D11i of the diode D11 decreases and reaches at t4 a current passing through the smoothing reactor L1. Then, the current ILS(t) becomes equal to the current of the smoothing reactor L1, the current D11i of the diode D11 becomes zero, and the diode D11 passes a reverse current due to a recovery current of the diode D11. The current Q1i of the switch Q1 is proportional to a current passing through the secondary winding S1 at the ratio of the numbers of turns. The current Q1i of the switch Q1, therefore, increases and reaches at t4 a value of n1/n2 (the ratio of the numbers of turns) times a current passing through the smoothing reactor L1.

At t4 of period T5, the recovery current of the diode D11 decreases, and the voltage Q11v of the switch Q11 increases. When the voltage Q11v of the switch Q11 reaches a gate threshold voltage Vth10 of the switch Q10, the switch Q10 turns on so that a current passing through the diode D10 changes its direction to the switch Q10. The voltage Q11v of the switch Q11 oscillates due to the joint capacitance of the leakage inductance LS and diode D11 and the output capacitance of the switch Q11. The oscillation gradually attenuates, and the voltage Q11v of the switch Q11 settles to be Vin·(n2/n1).

If the voltage Q11v of the switch Q11 oscillates to cross the gate threshold voltage Vth10 of the switch Q10, the switch Q10 repeatedly turns on and off to cause chattering as shown in an operational waveform of FIG. 6 involving large ringing. To suppress such oscillation, the CR snubber circuit consisting of the resistor R21 and capacitor C21 may be added. Since the primary winding P1 and secondary winding S1 are loosely coupled to increase the leakage inductance LS, the amplitude of the oscillation is large and the frequency thereof is low. This results in increasing a loss of the CR snubber circuit and deteriorating efficacy.

At t5 of period T6, the gate signal Q1g of the switch Q1 falls to zero, thereby zeroing the current Q1i of the switch Q1. The current passing through the route of Vin, P1, Q1, and Vin starts to change to a route of Vin, P1, C3, and Vin, to increase the voltage of the capacitor C3. As a result, the voltage Q1v of the switch Q1 increases and the voltage Q11v of the switch Q11 decreases.

At t6 of period T7, the voltage Q11v of the switch Q11 decreases to the gate threshold voltage Vth10 of the switch Q10. The switch Q10 turns off to zero the current Q10i of the switch Q10, and the current passing through the switch Q10 changes its direction to the diode D10.

At t7 of period T8, the voltage Q1v of the switch Q1 reaches Vin. The terminal voltage of the primary winding P1 becomes zero and the terminal voltage of the secondary winding S1 also becomes zero to zero the voltage Q11v of the switch Q11. The voltage Q1v of the switch Q1 further increases to apply positive potential to the winding end of the primary winding P1. The winding end of the secondary winding S1 also receives positive potential. At t8, the voltage Q1v of the switch Q1 reaches level of Vin+VC2. As a result, the terminal voltage of the primary winding P1 becomes VC2 and that of the secondary winding S1 becomes VC2·(n2/n1). In the period T8, the terminal voltage of the primary winding P1 with its winding end receiving positive potential changes from zero to VC2. At this time, the terminal potential of the secondary winding S1 with its winding end receiving positive potential changes from zero to a level of VC2·(n2/n1). Accordingly, the current ILS(t) passing through the leakage inductance LS decreases as following expression:

$$ILS(t) = ILS(t7) - (VS1(t)/LS) \cdot t \quad (3),$$

where VS1(t) is the terminal voltage of the secondary winding S1 and ILS(t7) is a current passing through the leakage inductance LS at t7. The current passing through the leakage inductance LS is equal to the current passing through the diode D10, and therefore, the current D10i of the diode D10 decreases in the period T8. By a decrement in the current D10i of the diode D1, the current D11i of the diode D11 increases.

In the period T8 on the secondary side of the transformer Ta, a current passes through the route of L1, C10, D10, LS, S1, and L1 and another current passes through the route of L1, C10, D11, and L1. The former current decreases according to the expression (3), and the latter current increases by the decrement of the former current.

At t8 of period T9, the capacitor C3 is completely charged, the voltage Q1v of the switch Q1 is substantially a level of Vin+VC2, and the terminal voltage of the primary winding P1 is VC2. Accordingly, the terminal voltage VS1 (t) of the secondary winding S1 is a level of VC2·(n2/n1) and the current ILS(t) passing through the leakage inductance LS decreases as following expression:

$$ILS(t) = ILS(t8) - (VS1(t)/LS) \cdot t \qquad (4)$$
$$= ILS(t8) - (VC2 \cdot (n2/n1)/LS) \cdot t,$$

where ILS(t8) is a current passing through the leakage inductance LS at t8. In this way, the current passing through the leakage inductance LS decreases, and by this decrement, the current D11i of the diode D11 increases. At t9, the current D10i of the diode D10 becomes zero, and the diode D10 passes a reverse current due to a recovery current. The current D11i of the diode D11 becomes equal to a current passing through the smoothing reactor L1. The current Q2i of the switch Q2 is proportional to a current passing through the secondary winding S1 at the ratio of the numbers of turns. Namely, the current Q2i of the switch Q2 increases and becomes an excitation current of the primary winding P1 at t9.

At t9 of period T10, the recovery current of the diode D10 decreases and the voltage Q10v of the switch Q10 increases. The voltage Q10v reaches the gate threshold voltage Vth11 of the switch Q11 to turn on the switch Q11. Then, a current passing to the diode D11 changes its direction to the switch Q11.

The voltage Q10v of the switch Q10 oscillates due to the joint capacitance of the leakage inductance LS and diode D10 and the output capacitance of the switch Q10. The oscillation of the voltage Q10v gradually attenuates and reaches a level of VC2·(n2/n1).

If the voltage Q10v of the switch Q10 oscillates to cross the gate threshold voltage Vth11 of the switch Q11, the switch Q11 repeatedly turns on and off to cause chattering as shown in an operational waveform of FIG. 6 involving large ringing. To suppress such oscillation, the CR snubber circuit consisting of the resistor R20 and capacitor C20 may be added. Since the primary winding P1 and secondary winding S1 are loosely coupled to increase the leakage inductance LS, the amplitude of the oscillation is large and the frequency thereof is low. This results in increasing a loss of the CR snubber circuit and deteriorating efficacy.

In this way, driving the synchronous rectifiers by the secondary winding S1 according to the related art passes a current to the diode D10 in the periods T3, T4, T7, T8, and T9 and a current to the diode D11 in the periods T2, T3, T4, T8, and T9. Namely, during these periods, no current passes through the synchronous rectifiers (switches Q10 and Q11). Instead, the currents pass through the diodes D10 and D11 during the periods, thereby deteriorating the efficiency of synchronous rectification and the efficiency of a power source. In addition, the diodes D10 and D11 connected in parallel with the synchronous rectifiers produce recovery currents that repeatedly turn on/off the synchronous rectifiers. This results in causing the chattering of the synchronous rectifiers and deteriorating efficiency. Adding the CR snubber circuits to suppress the chattering will increase losses and deteriorate efficiency.

FIG. 3 is a circuit diagram showing a DC converter according to a second related art. In FIG. 3, the primary side of a transformer Tb employs an active clamp circuit and is the same as the primary side of the transformer Ta of FIG. 1, and therefore, the explanation thereof is omitted. The transformer Tb has a primary winding (having the number of turns of n1), a first secondary winding S1 (having the number of turns of n2) very loosely coupled with the primary winding P1, and a second secondary winding S2 (having the number of turns of n3) loosely coupled with the primary winding P1. A first end of the first secondary winding S1 is connected to a first end of the second secondary winding S2. The ends of the first secondary winding S1 are connected through a leakage inductance L1 to a saturable reactor LH. The saturable reactor LH is formed with the use of the saturation characteristic of a core of the transformer Tb.

A second end (indicated with a filled circle) of the second secondary winding S2 is connected through a leakage inductance LS to the cathode of a diode D11. The first end of the second secondary winding S2 is connected to the cathode of a diode D10. The anode of the diode D10 is connected to the anode of the diode D11.

The ends of the diode D10 are connected to the drain and source of a switch Q10 such as a MOSFET. The ends of the diode D11 are connected to the drain and source of a switch Q11 such as a MOSFET. The gate of the switch Q11 is connected to the first end of the second secondary winding S2. The gate of the switch Q10 is connected through the leakage inductance LS to the second end of the second secondary winding S2. The second end of the first secondary winding S1 is connected through the leakage inductance L1 to a first end of a capacitor C10. A second end of the capacitor C10 is connected to a node between the anode of the diode D10 and the anode of the diode D11.

The leakage inductance LS exists between the loosely coupled primary winding P1 and second secondary winding S2. The leakage inductance L1 between the very loosely coupled primary winding P1 and first secondary winding S1 serves as a smoothing reactor of the forward converter and accumulates energy when a switch Q1 is ON. When the switch Q1 is OFF, the second secondary winding S2 returns the energy accumulated in the leakage inductance L1 to the secondary side of the transformer Tb.

The leakage inductance LS stores energy accumulated when the switch Q1 is ON into a clamp capacitor C2, to drop a core around which the first secondary winding S1 is wound to the third quadrant and saturate the same.

FIG. 4 is a view showing the structure of the transformer Tb of the DC converter according to the second related art. FIG. 5 is an equivalent circuit diagram showing the transformer of FIG. 4. In FIG. 4, the transformer Tb has a core 30 having a rectangular external shape. The core 30 has spaces 35a and 35b extending in parallel to each other in a longitudinal magnetic path direction, to form magnetic paths 32a, 32b, and 32c. Around a core part 30a of the core 30, the primary winding P1 and second secondary winding S2 are wound adjacent to each other. This produces the slight leakage inductance LS between the primary winding P1 and the second secondary winding S2. The core 30 has a path core 30c and a gap 31. Around a peripheral core, the first secondary winding S1 is wound. The path core 30c works to very loosely couple the primary winding P1 and first secondary winding S1 with each other, thereby increasing the leakage inductance L1.

On the peripheral core and between the primary winding P1 and the second secondary winding S2, a recess 30b is formed. The recess 30b reduces the sectional area of a part of a magnetic path of the core so that only the part may saturate. This configuration can reduce a core loss. The part that saturates is used as the saturable reactor LH. Forming the recess 30b at a part of the core 30 where the first secondary winding S1 is wound results in saturating the part, increasing an excitation current, and producing a voltage resonance. Black dots shown in FIG. 5 indicate the winding starts of the primary winding P1, first secondary winding S1, and second secondary winding S2 of the transformer Tb.

Operation of the DC converter of FIG. 3 will be explained with reference to a timing chart of FIG. 7.

Before t0, the switch Q1 is OFF and the switch Q2 ON. On the primary side of the transformer Tb, a current passes through a route of Q2, P1, C2, and Q2. On the secondary side of the transformer Tb, a current passes through a route of L1, C10, Q11, LS, S2, S1, and L1. A voltage Q11v of the switch Q11 is substantially zero. The switch Q10 is OFF. The primary winding P1 of the transformer Tb receives a voltage VC2 from the clamp capacitor C2, and the potential of the winding end of the primary winding P1 is positive. Accordingly, a terminal voltage of the second secondary winding S2 is a level of VC2·(n3/n1) and the potential of the winding end of the second secondary winding S2 is positive.

The voltage of the first secondary winding S1 (including the leakage inductance L1) is a level of VC2·(n3/n1)−Vout and the potential of the winding end of the first secondary winding S1 is positive. The voltage Q10v of the switch Q10, therefore, is positive and is equal to a level of VC2·(n3/n1). Namely, the gate voltage of the switch Q11 is positive, and therefore, the switch Q11 is ON.

At t0 of period T1, the switch Q2 changes from ON to OFF and a current passing through the path along Q2, P1, C2, and Q2 becomes zero. Instead, a current passes through a path along P1, Vin, C3, and P1, to discharge a capacitor C3 and drop the voltage Q1v of the switch Q1. When the voltage Q1v drops, the terminal voltage of the primary winding P1 decreases to decrease the terminal voltage of the second secondary winding S2. This results in decreasing the voltage Q10v of the switch Q10.

At t1 of period T2, the voltage Q10v of the switch Q10 decreases to a gate threshold voltage Vth11 of the switch Q11, to turn off the switch Q11. A current Q11i of the switch Q11 becomes zero, and the current to the switch Q11 starts to pass through the diode D11.

At t2 of period T3, the voltage Q1v of the switch Q1 reaches Vin. The terminal voltage of the primary winding P1 becomes zero, and therefore, the terminal voltage of the second secondary winding S2 becomes zero. This drops the voltage Q10v of the switch Q10 to zero. The voltage Q1v of the switch Q1 further decreases to apply positive potential to the winding start of the primary winding P1, and therefore, positive potential is applied to the winding start of the second secondary winding S2. At t3, the voltage Q1v of the switch Q1 becomes zero. Then, the terminal voltage of the primary winding P1 becomes Vin and the terminal voltage of the second secondary winding S2 becomes a level of Vin·(n3/n1). In the period T3, the terminal voltage of the primary winding P1 changes from zero to Vin with the winding start of the primary winding P1 being positive. At this time, the terminal voltage of the second secondary winding S2 changes from zero to a level of Vin·(n3/n1) with the winding start of the second secondary winding S2 being positive.

Accordingly, a current ILS(t) passing through the leakage inductance LS decreases as following expression:

$$ILS(t) = ILS(t2) - (VS2(t)/LS) \cdot t \quad (5),$$

where VS2(t) is a terminal voltage of the second secondary winding S2 and ILS(t2) is a current passing through the leakage inductance LS at t2. The current passing through the leakage inductance LS is equal to the current of the diode D11, and therefore, the current D11i of the diode D11 decreases in the period T3.

By a decrement of the current D11i of the diode D11, the current D10 of the diode D10 increases. During the period T3 on the secondary side of the transformer Tb, a current passes through a path along L1, C10, D11, LS, S2, S1, and L1 and another current passes through a path along L1, C10, D10, S1, and L1. The former current decreases according to the expression (5), and the latter current increases thereby.

At t3 of period T4, the capacitor C3 completely discharges, the voltage Q1v of the switch Q1 becomes zero, the current passing through the path along P1, Vin, C3, and P1 changes its direction to a path along P1, Vin, D1 (Q1), and P1, and the switch Q1 turns on in response to a gate signal Q1g.

In the period T4, the voltage Q1v of the switch Q1 is substantially zero and the terminal voltage of the primary winding P1 is Vin. The terminal voltage VS2(t) of the second secondary winding S2, therefore, is a level of Vin·(n3/n1). The current ILS(t) passing through the leakage inductance LS decreases as following expression:

$$ILS(t) = ILS(t3) - (VS2(t)/LS) \cdot t \quad (6)$$
$$= ILS(t3) - (Vin \cdot (n3/n1)/LS) \cdot t,$$

where ILS(t3) is a current passing through the leakage inductance LS at t3. By a decrement of the current passing through the leakage inductance LS, the current D10i of the diode D10 increases. At t4, the current D10i of the diode D10 reaches a current passing through the leakage inductance L1. Then, the current D11i of the diode D11 becomes zero and the diode D11 passes a reverse current due to a recovery current of the diode D11.

The current Q1i of the switch Q1 is proportional to a current passing through the second secondary winding S2 at the ratio of the numbers of turns. The current Q1i of the switch Q1, therefore, increases and reaches at t4 the ratio of the numbers of turns times the current passing through the leakage inductance L1.

At t4 of period T5, the recovery current of the diode D11 decreases, and the voltage Q11v of the switch Q11 increases. When the voltage Q11v of the switch Q11 reaches a gate threshold voltage Vth10 of the switch Q10, the switch Q10 turns on so that the current passing through the diode D10 changes its direction to the switch Q10. The voltage Q11v of the switch Q11 oscillates due to the joint capacitance of the leakage inductance LS and diode D11 and the output capacitance of the switch Q11. The oscillation gradually attenuates, and the voltage Q11v of the switch Q11 settles to a level of Vin·(n3/n1).

If the voltage Q11v of the switch Q11 oscillates to cross the gate threshold voltage Vth10 of the switch Q10, the switch Q10 repeatedly turns on and off to cause chattering as shown in the operational waveform of FIG. 6 involving large ringing. To suppress such oscillation, a CR snubber circuit consisting of a resistor R21 and a capacitor C21 may be added. Since the primary winding P1 and second secondary winding S2 are loosely coupled to increase the leakage inductance LS, the amplitude of the oscillation is large and the frequency thereof is low. This results in increasing a loss of the CR snubber circuit and deteriorating efficacy.

At t5 of period T6, the gate signal Q1g of the switch Q1 falls to zero, to zero the current Q1i of the switch Q1. The current passing through the path along Vin, P1, Q1, and Vin starts to change to the route of Vin, P1, C3, and Vin, to increase the voltage of the capacitor C3. As a result, the voltage Q1v of the switch Q1 increases and the voltage Q11v of the switch Q11 decreases.

At t6 of period T&, the voltage Q11v of the switch Q11 decreases to the gate threshold voltage Vth10 of the switch Q10. The switch Q10 turns off to zero the current Q10i of the switch Q10, and the current passing through the switch Q10 changes its direction to the diode D10.

At t7 of period T8, the voltage Q1v of the switch Q1 reaches Vin. The terminal voltage of the primary winding P1 becomes zero and the terminal voltage of the second secondary winding S2 also becomes zero to zero the voltage Q11v of the switch Q11. The voltage Q1v of the switch Q1 further increases to apply positive potential to the winding end of the primary winding P1. The winding end of the second secondary winding S2 also receives positive potential. At t8, the voltage Q1v of the switch Q1 reaches a level of Vin+VC2. As a result, the terminal voltage of the primary winding P1 becomes VC2 and that of the second secondary winding S2 becomes a level of VC2·(n3/n1).

In the period T8, the terminal voltage of the primary winding P1 with its winding end receiving positive potential changes from zero to VC2. At this time, the terminal potential of the second secondary winding S2 with its winding end receiving positive potential changes from zero to a level of VC2·(n3/n1). Accordingly, the current ILS(t) passing through the leakage inductance LS increases as following expression:

$$ILS(t) = (VS2(t)/LS) \cdot t \quad (7),$$

where VS2(t) is the terminal voltage of the second secondary winding S2. The current passing through the leakage inductance LS is equal to the current passing through the diode D11, and therefore, the current D11i of the diode D11 increases in the period T8. By an increment in the current D11i of the diode D11, the current D10i of the diode D10 decreases.

In the period T8 on the secondary side of the transformer Tb, a current passes through the route of L1, C10, D10, S1, and L1 and another current passes through the route of L1, C10, D11, LS, S2, S1, and L1. The latter current increases according to the expression (7), and the former current decreases by the increment of the latter current.

At t8 of period T9, the capacitor C3 is completely charged, the voltage Q1v of the switch Q1 is substantially a level of Vin+VC2, and the terminal voltage of the primary winding P1 is VC2. Accordingly, the terminal voltage VS2 (t) of the second secondary winding S2 is a level of VC2·(n3/n1) and the current ILS (t) passing through the leakage inductance LS increases as following expression:

$$ILS(t) = ILS(t8) + (VS2(t)/LS) \cdot t \quad (8)$$
$$= ILS(t8) + (VC2 \cdot (n3/n1)/LS) \cdot t,$$

where ILS(t8) is a current passing through the leakage inductance LS at t8. In this way, the current passing through the leakage inductance LS increases, and by this increment, the current D10i of the diode D10 decreases. At t9, the current D10i of the diode D10 becomes zero, and the diode D10 passes a reverse current due to a recovery current. The current D11i of the diode D11 becomes equal to a current passing through the leakage inductance L1. The current Q2i of the switch Q2 is proportional to a current passing through the second secondary winding S2 at the ratio of the numbers of turns. Namely, the current Q2i of the switch Q2 increases and becomes an excitation current of the primary winding P1 at t9.

At t9 of period T10, the recovery current of the diode D10 decreases and the voltage Q10v of the switch Q10 increases. The voltage Q10v reaches the gate threshold voltage Vth11 of the switch Q11 to turn on the switch Q11. Then, a current passing through the diode D1 changes its direction to the switch Q11. The voltage Q10v of the switch Q10 oscillates due to the joint capacitance of the leakage inductance LS and diode D10 and the output capacitance of the switch Q10. The oscillation of the voltage Q10v gradually attenuates and reaches a level of VC2·(n3/n1).

If the voltage Q10v of the switch Q10 oscillates to cross the gate threshold voltage Vth11 of the switch Q11, the switch Q11 repeatedly turns on and off to cause chattering as shown in the operational waveform of FIG. 6 involving large ringing. To suppress such oscillation, a CR snubber circuit consisting of a resistor R20 and a capacitor C20 may be added. Since the primary winding P1 and second secondary winding S2 are loosely coupled to increase the leakage inductance LS, the amplitude of the oscillation is large and the frequency thereof is low. This results in increasing a loss of the CR snubber circuit and deteriorating efficacy.

SUMMARY OF THE INVENTION

The DC converter of the second related art of FIG. 3 has problems similar to the DC converter of the first related art of FIG. 1. Namely, driving the synchronous rectifiers by the second secondary winding S2 passes a current to the diode D10 in the periods T3, T4, T7, T8, and T9 and a current to the diode D11 in the periods T2, T3, T4, T8, and T9. Namely, during these periods, no current is passed through the synchronous rectifiers (switches Q10 and Q11). Instead, currents are passed through the diodes D10 and D11 during the periods, thereby deteriorating the efficiency of synchronous rectification and the efficiency of a power source. In addition, the diodes D10 and D11 connected in parallel with the synchronous rectifiers produce recovery currents that repeatedly turn on/off the synchronous rectifiers. This results in causing the chattering of the synchronous rectifiers and deteriorating efficiency. Adding the CR snubber circuits to suppress the chattering will increase losses and deteriorate efficiency.

An object of the present invention is to provide a DC converter capable of stably driving synchronous rectifiers and improving efficiency.

In order to accomplish the object, a first technical aspect of the present invention provides a DC converter having a transformer with loosely coupled primary and secondary windings, a main switch connected in series with the primary winding, and a series circuit connected to ends of one of the primary winding and main switch, the series circuit including a clamp capacitor and an auxiliary switch. The main and auxiliary switches are alternately turned on/off so that a voltage of the secondary winding of the transformer is synchronously rectified with synchronous rectifiers and is smoothed with smoothing elements, to provide a DC output. The DC converter also includes a tertiary winding tightly coupled with the primary winding of the transformer, a voltage source to supply a voltage lower than a voltage generated by the tertiary winding of the transformer, and clamp diodes to clamp the voltage generated by the tertiary winding with the use of the voltage source. The clamp diodes provide voltage-clamped signals to drive the synchronous rectifiers.

DESCRIPTION OF THE PREFERRED EMBODIMENT

DC converters according to embodiments of the present invention will be explained in detail with reference to the drawings.

First Embodiment

Figure 8:
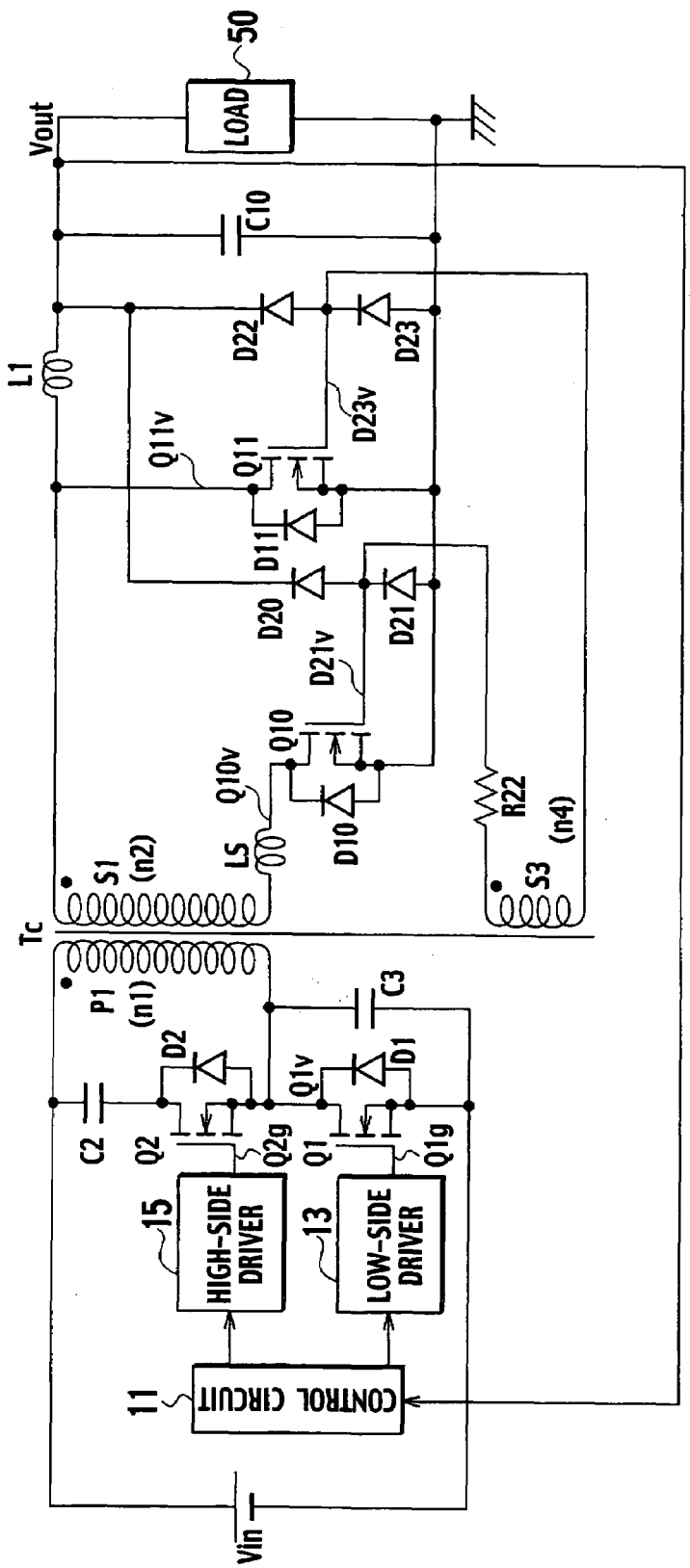
FIG. 8 is a circuit diagram showing a DC converter according to an first embodiment of the present invention.

FIG. 8 is a circuit diagram showing a DC converter according to the first embodiment of the present invention. The first embodiment will be mainly explained in connection with parts that are different from those of the DC converter of FIG. 1.

A transformer Tc has a primary winding P1 (having the number of turns of n1), a secondary winding S1 (having the number of turns of n2) loosely coupled with the primary winding P1, and a tertiary winding S3 (having the number of turns of n4) tightly coupled with the primary winding P1. The tertiary winding S3 is connected in series with a resistor R22. Ends of a smoothing capacitor C10 are connected to a series circuit including clamp diodes D20 and D21, as well as to a series circuit including clamp diodes D22 and D23. A first end of the resistor R22 is connected to a node between the clamp diodes D20 and D21 and to the gate of a switch Q10. A first end of the tertiary winding S3 is connected to a node between the clamp diodes D22 and D23 and to the gate of a switch Q11. A second end of the resistor R22 is connected to a second end of the tertiary winding S3.

To turn on the switch Q10 when a switch Q1 is ON, the winding start of the tertiary winding S3 is connected through the resistor R22 to the gate of the switch Q10. To turn on the switch Q11 when the switch Q1 is OFF, the winding end of the tertiary winding S3 is connected to the gate of the switch Q11.

The smoothing capacitor C10 provides an output voltage Vout serving as a voltage source (herein after referred to as "clamp voltage source"). The output voltage Vout is lower than a voltage generated by the tertiary winding S3. The clamp voltage source may be a discrete power source.

The clamp diodes D20, D21, D22, and D23 clamp a winding voltage generated by the tertiary winding S3 at the output voltage Vout, i.e., the clamp voltage source. The resistor R22 limits a clamp current passing through the clamp diodes when the winding voltage is clamped at the clamp voltage.

Recovery currents of the clamp diodes D20, D21, D22, and D23 are used so that voltage signals clamped by the clamp diodes D20, D21, D22, and D23 may drive the gates of the switches Q10 and Q11 serving as synchronous rectifiers. This operation extends the ON period of each synchronous rectifier and improves the efficiency of synchronous rectification. More precisely, the clamp diodes D20 and D21 clamp a signal D21v that serves as a drive signal for driving the gate of the switch Q10. The clamp diodes D22 and D23 clamp a signal D23v that serves as a drive signal for driving the gate of the switch Q11.

Driving the synchronous rectifiers with the tertiary winding S3 realizes stable operation of the synchronous rectifiers and improves efficiency because the synchronous rectifiers are never repeatedly turned on and off to cause chattering due to oscillation caused by recovery currents of rectifying diodes that are connected in parallel with the synchronous rectifiers.

The tertiary winding S3 is tightly coupled with the primary winding P1, and therefore, has the same voltage waveform as that of the primary winding P1. The DC converter according to the first embodiment, therefore, can extend the ON period of each synchronous rectifier and improve the efficiency thereof. The DC converter employs the tertiary winding S3 tightly coupled with the primary winding P1, to drive the synchronous rectifiers, i.e., the switches Q10 and Q11. This prevents the synchronous rectifiers from repeatedly turning on and off to cause chattering due to oscillation caused by recovery currents of the rectifying diodes D10 and D11 connected in parallel with the synchronous rectifiers. Namely, the DC converter of this embodiment can stably drive the synchronous rectifiers and improve the efficiency thereof.

Figure 1:
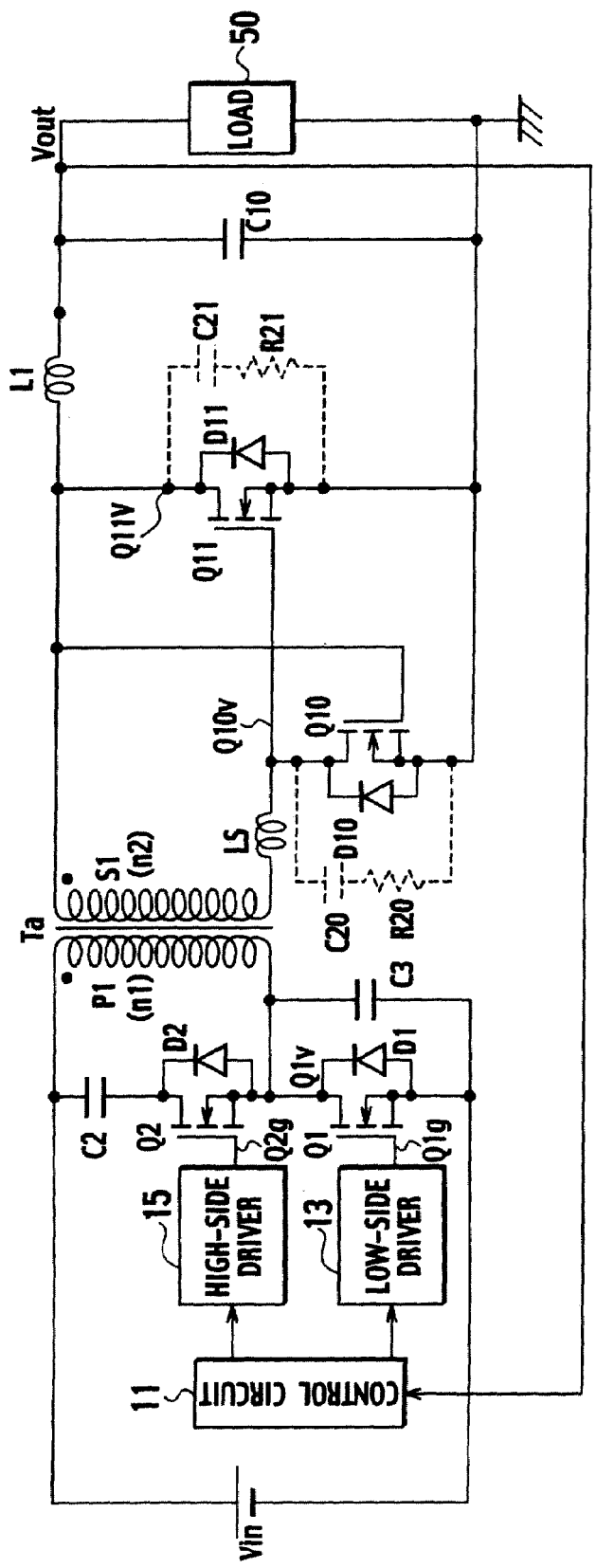
FIG. 1 is a circuit diagram showing a DC converter according to a first related art.

Compared with the DC converter of FIG. 1, the DC converter of FIG. 8 has no CR snubber circuits (the resistors R20 and R21 and capacitors C20 and C21).

Figure 2:
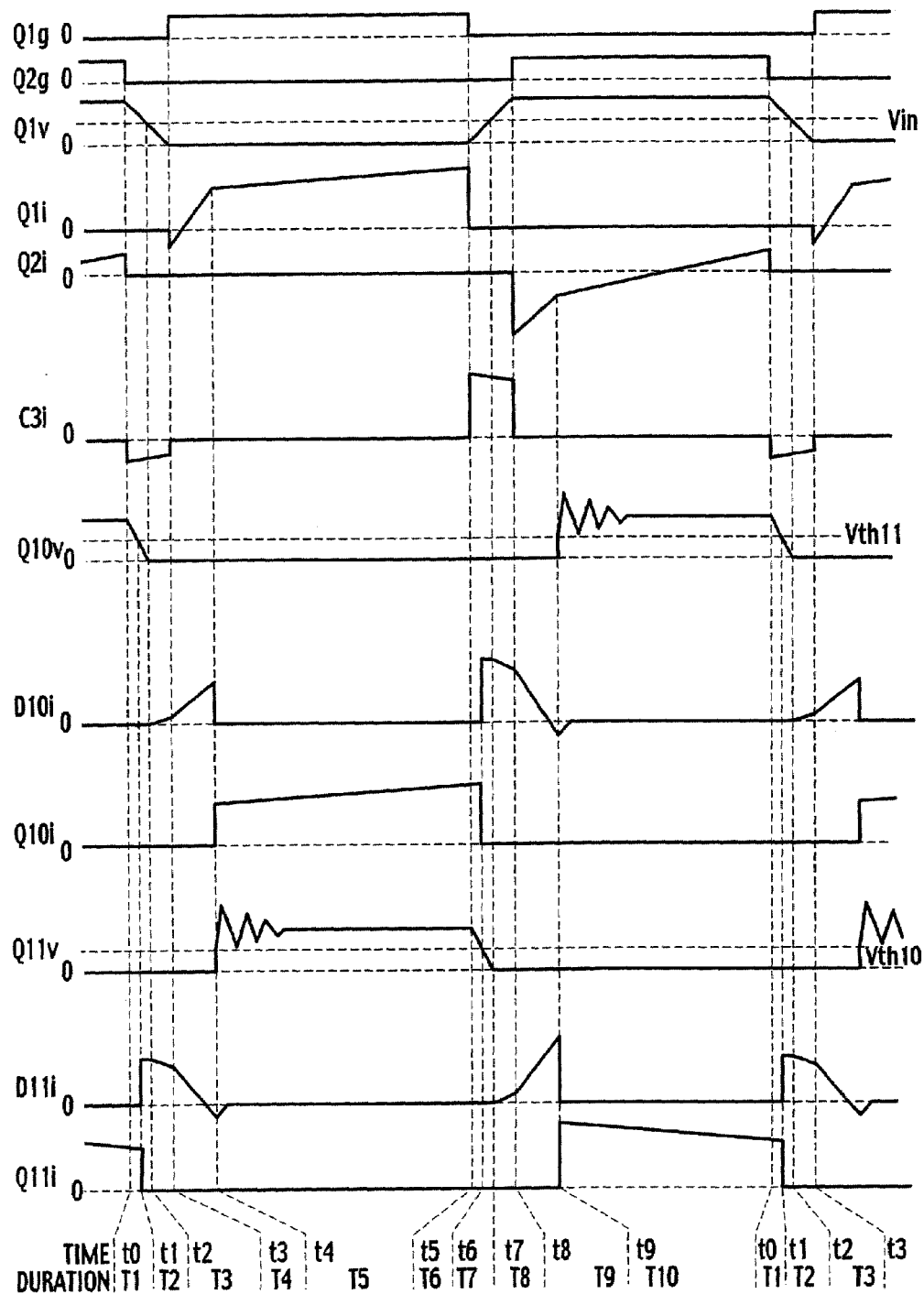
FIG. 2 is a timing chart showing signals at various parts of the DC converter according to the first related art.

Operation of the DC converter according to the first embodiment will be explained with reference to a timing chart of FIG. 9. In addition to the signals shown in FIG. 2, FIG. 9 includes currents D20i, D21i, D22i, and D23i passing through the clamp diodes D20, D21, D22, and D23, respectively, a drive signal D21v for driving the gate of the switch Q10, and a drive signal D23v for driving the gate of the switch Q11.

Before t0, the switch Q1 is OFF and a switch Q2 ON. On the primary side of the transformer Tc, a current passes through a path along Q2, P1, C2, and Q2. The primary winding P1 of the transformer Tc receives a voltage VC2 from the clamp capacitor C2, and the potential of the winding end of the primary winding P1 is positive. Accordingly, the potential of the winding end of the tertiary winding S3 is positive, and a current passes through a path along S3, D22, C10, D21, R20, and S3. The voltage D23v is substantially equal to the clamp voltage (output voltage Vout), and therefore, the gate voltage of the switch Q11 is positive to turn on the switch Q11. The voltage D21v is substantially at a ground voltage GND, and therefore, the switch Q10 is OFF. The clamp diodes D21 and D22 pass the currents D21i and D22i that are expressed as following expression:

$$D21i = D22i = (Vc2 \cdot (n4/n1) - Vout)/R22.$$

On the secondary side of the transformer Tc, a current passes through a path along L1, C10, Q11, and L1.

At t0 of period T1, the switch Q2 changes from ON to OFF and the current passing through the path along Q2, P1, C2, and Q2 becomes zero. Instead, a current passes through a path along P1, Vin, C3, and P1, to discharge the capacitor C3 and drop a voltage Q1v of the switch Q1. When the voltage Q1v drops, the terminal voltage of the primary winding P1 decreases to decrease the terminal voltage of the tertiary winding S3. This results in decreasing the currents D21i and D22i. At the same time, the terminal voltage of the secondary winding S1 decreases to decrease the voltage Q10v of the switch Q10.

At t2 of period T3, the voltage Q1v of the switch Q1 reaches a level of Vin. The terminal voltage of the primary winding P1 becomes zero, and therefore, the terminal voltage of the tertiary winding S3 becomes zero to zero the currents D21i and D22i. The terminal voltage of the secondary winding S1 also becomes zero to zero the voltage Q10v of the switch Q10. The voltage Q1v of the switch Q1 further decreases to apply positive potential to the winding start of the primary winding P1, and therefore, positive potential is applied to the winding start of the tertiary winding S3. A current flows through a path along S3, R22, D20, C10, D23, and S3 to make the clamp diodes D20 and D23 conductive. As a result, the voltage D23v becomes substantially zero, the switch Q11 turns off, and the current passing through the switch Q11 changes its direction to the diode D11.

The voltage D21v becomes substantially the clamp voltage to turn on the switch Q10. The winding start of the secondary winding S1 receives positive potential. At t3, the voltage Q1v of the switch Q1 becomes zero. Then, the terminal voltage of the primary winding P1 becomes Vin and the terminal voltage of the secondary winding S1 becomes a level of Vin·(n2/n1). In the period T3, the terminal voltage of the primary winding P1 changes from zero to Vin with the winding start of the primary winding P1 being positive. At this time, the terminal voltage of the secondary winding S1 changes from zero to a level of Vin·(n2/n1) with the winding start of the secondary winding S1 being positive.

Accordingly, a current ILS(t) passing through a leakage inductance LS increases as following expression:

$$ILS(t) = (VS1(t)/LS) \cdot t \qquad (9),$$

where VS1(t) is the terminal voltage of the secondary winding S1. The current passing through the leakage inductance LS is equal to the current of the diode D10, and therefore, the current Q10i of the switch Q10 increases in the period T3. By an increment of the current Q10i of the switch Q10, the current D11i of the diode D11 decreases.

During the period T3 on the secondary side of the transformer Tc, a current passes through a path along L1, C10, D11, and L1 and another current passes through a path along L1, C10, Q10, LS, S1, and L1. The latter current increases according to the expression (9), and the former current decreases thereby.

At t3 of period T4, the capacitor C3 completely discharges, the voltage Q1v of the switch Q1 becomes zero, the current passing through the path along P1, Vin, C3, and P1 changes its direction to a route of P1, Vin, D1 (Q1), and P1, and the switch Q1 turns on in response to the gate signal Q1g.

In the period T4, the voltage Q1v of the switch Q1 is substantially zero and the terminal voltage of the primary winding P1 is a level of Vin. The terminal voltage VS1(t) of the secondary winding S1, therefore, is a level of Vin·(n2/n1). The current ILS(t) passing through the leakage inductance LS increases as following expression:

$$\begin{aligned} ILS(t) &= (VS1(t)/LS) \cdot t + ILS(t3) \\ &= (Vin \cdot (n2/n1)/LS) \cdot t + ILS(t3), \end{aligned} \qquad (10)$$

where ILS(t3) is a current passing through the leakage inductance LS at t3. By an increment of the current passing through the leakage inductance LS, the current D11i of the diode D11 decreases and reaches at t4 a current passing through the smoothing reactor L1. Then, the current ILS(t) becomes equal to the current of the smoothing reactor L1, the current D11i of the diode D11 becomes zero, and the diode D11 passes a reverse current due to a recovery current of the diode D11.

The current Q1i of the switch Q1 is proportional to a current passing through the secondary winding S1 at the ratio of the numbers of turns. The current Q1i of the switch Q1, therefore, increases and reaches at t4 the current passing through the smoothing reactor L1 times the ratio of the numbers of turns.

The currents D20i and D23i of the clamp diodes D20 and D23 passing through the path along S3, R22, D20, C10, D23, and S3 are expressed as following expression:

$$D20i = D23i = (Vin \cdot (n4/n1) - Vout)/R22.$$

Figure 6:
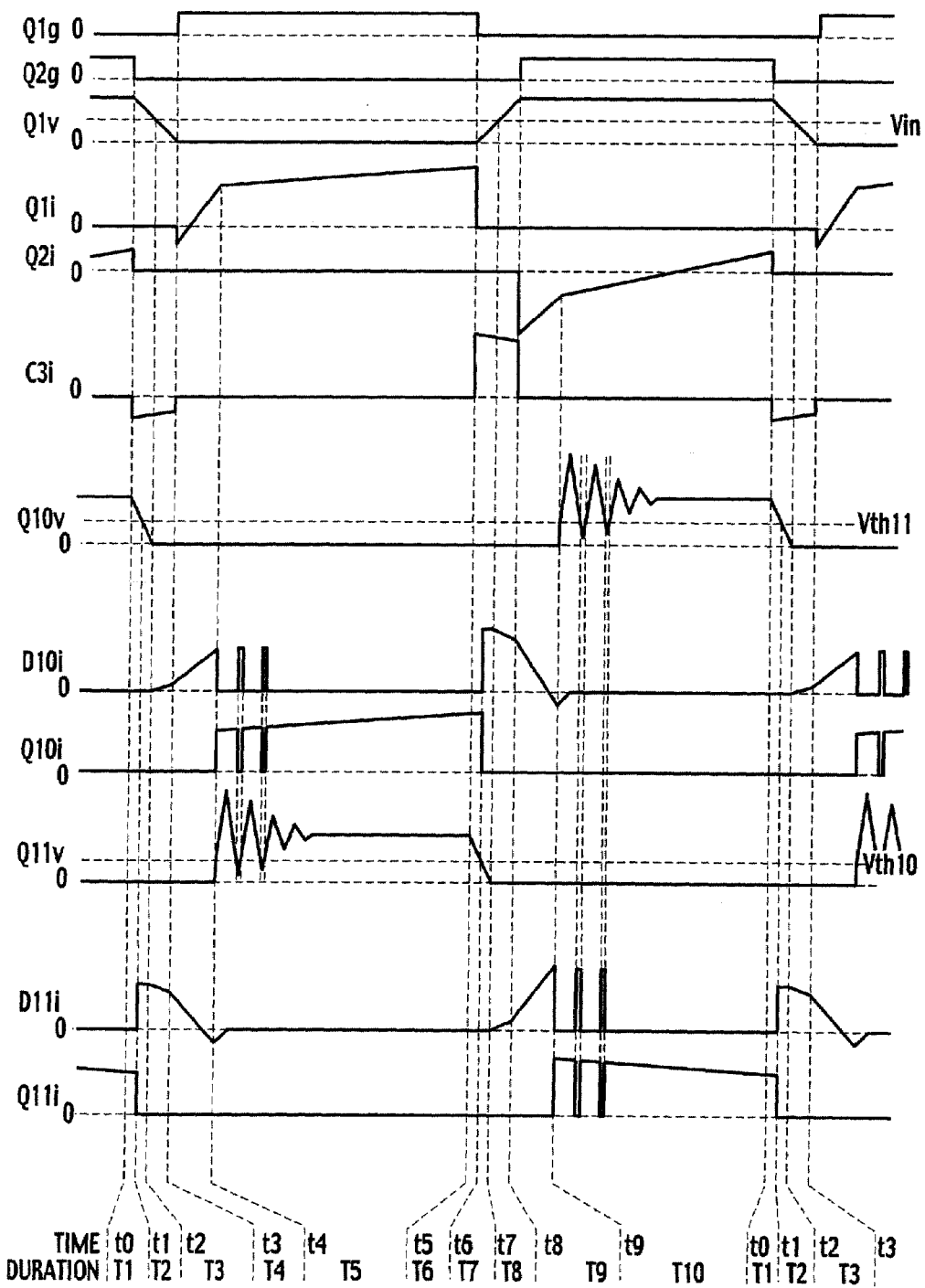
FIG. 6 is a timing chart showing signals at various parts of the DC converter according to the second related art.
Figure 7:
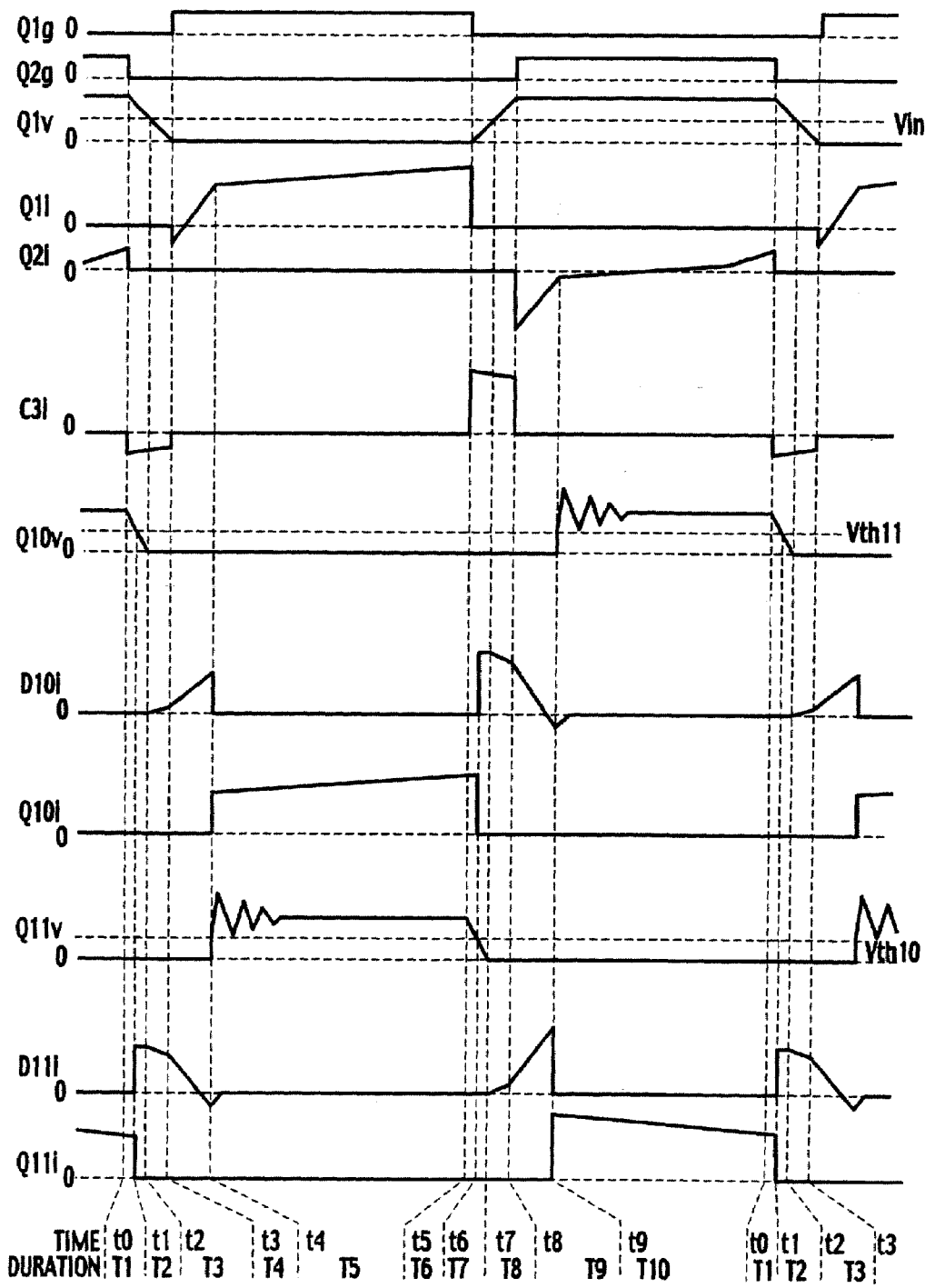
FIG. 7 is a timing chart showing signals at various parts of the DC converter according to the second related art.

At t4 of period T5, the recovery current of the diode D11 decreases, and the voltage Q11v of the switch Q11 increases. The voltage Q11v of the switch Q11 oscillates due to the joint capacitance of the leakage inductance LS and diode D11 and the output capacitance of the switch Q11. The oscillation gradually attenuates, and the voltage Q11v of the switch Q11 settles to a level of Vin·(n2/n1). Even if the oscillation becomes larger, the tertiary winding S3 that drives the switches Q10 and Q11, i.e., the synchronous rectifiers and is tightly coupled with the primary winding P1 is never affected thereby. Accordingly, the switch Q10 is not repeatedly turned on and off to cause the chattering observed in the operational waveforms of the related art shown in FIG. 6.

At t5 of period T6, the gate signal Q1g of the switch Q1 falls to zero the current Q1i of the switch Q1. The current passing through the path along Vin, P1, Q1, and Vin starts to change to the path along Vin, P1, C3, and Vin, to increase the voltage of the capacitor C3. As a result, the voltage Q1v of the switch Q1 increases, the terminal voltage of the primary winding P1 decreases, and the terminal voltage of the tertiary winding S3 decreases to decrease the currents to the clamp diodes D20 and D23. At the same time, the voltage of the secondary winding S1 decreases to drop the voltage Q11v of the switch Q11.

At t7 of period T8, the voltage Q1v of the switch Q1 reaches Vin. The terminal voltage of the primary winding P1 becomes zero and the terminal voltage of the tertiary winding S3 becomes zero to zero the currents D20i and D23i of the clamp diodes D20 and D23. At the same time, the terminal voltage of the secondary winding S1 becomes zero to zero the voltage Q11v of the switch Q11. The voltage Q1v of the switch Q1 further increases to apply positive potential to the winding end of the primary winding P1. The winding end of the tertiary winding S3 also receives positive potential. Then, a current passes through a path along S3, D22, C10, D21, R22, and S3 to make the clamp diodes D21 and D22 conductive. The voltage D21v becomes nearly zero, the switch Q10 turns off, and the current passing through the switch Q10 changes its direction to the diode D10. The voltage D23v becomes nearly equal to the clamp voltage to turn on the switch Q11. The winding end of the secondary winding S1 also receives positive potential. At t8, the voltage Q1v of the switch Q1 reaches a level of Vin+VC2. As a result, the terminal voltage of the primary winding P1 becomes VC2 and that of the secondary winding S1 becomes a level of VC2·(n2/n1).

In the period T8, the terminal voltage of the primary winding P1 with its winding end receiving positive potential changes from zero to VC2. At this time, the terminal potential of the secondary winding S1 with its winding end receiving positive potential changes from zero to a level of VC2·(n2/n1). Accordingly, the current ILS(t) passing through the leakage inductance LS decreases as following expression:

$$ILS(t)=ILS(t7)-(VS1(t)/LS)\cdot t \quad (11),$$

where VS1(t) is the terminal voltage of the secondary winding S1 and ILS(t7) is a current passing through the leakage inductance LS at t7. The current passing through the leakage inductance LS is equal to the current passing through the diode D10, and therefore, the current D10i of the diode D10 decreases in the period T8. By a decrement in the current D10i of the diode D10, the current Q11i of the switch Q11 increases. In the period T8 on the secondary side of the transformer Tc, a current passes through a path along L1, C10, D10, LS, S1, and L1 and another current passes through the path along L1, C10, Q11, and L1. The former current decreases according to the expression (11), and the latter current increases by the decrement of the former current.

At t8 of period T9, the capacitor C3 is completely charged, the voltage Q1v of the switch Q1 is substantially a level of Vin+VC2, and the terminal voltage of the primary winding P1 is VC2. Accordingly, the terminal voltage VS1 (t) of the secondary winding S1 is a level of VC2·(n2/n1) and the current ILS(t) passing through the leakage inductance LS decreases as following expression:

$$ILS(t) = ILS(t8) - (VS1(t)/LS) \cdot t \quad (12)$$
$$= ILS(t8) - (VC2 \cdot (n2/n1)/LS) \cdot t,$$

where ILS(t8) is a current passing through the leakage inductance LS at t8. In this way, the current passing through the leakage inductance LS decreases, and by this decrement, the current Q11i of the switch Q11 increases. At t9, the current passing through the leakage inductance LS becomes zero, and the current Q11i of the switch Q11 becomes equal to a current passing through the smoothing reactor L1.

The current Q2i of the switch Q2 is proportional to a current passing through the secondary winding S1 at the ratio of the numbers of turns. Namely, the current Q2i of the switch Q2 increases and becomes an excitation current of the primary winding P1 at t9.

The currents D21i and D22i of the diodes D21 and D22 passing through the path along S3, D22, C10, D21, R22, and S3 are expressed as following expression:

$$D21i=D22i=(VC2\cdot(n4/n1)-Vout)/R22.$$

At t9 of period T10, a recovery current of the diode D10 decreases and the voltage Q10v of the switch Q10 increases. The voltage Q10v oscillates due to the joint capacitance of the leakage inductance LS and diode D10 and the output capacitance of the switch Q10. The oscillation gradually attenuates and the voltage Q10v becomes a level of VC2·(n2/n1). Even if the oscillation becomes larger, the tertiary winding S3 that drives the switches Q10 and Q11, i.e., the synchronous rectifiers and is tightly coupled with the primary winding P1 is never affected thereby. Accordingly, the switch Q11 is never repeatedly turned on and off to cause the chattering observed in the operational waveforms of the related art shown in FIG. 6.

In this way, the first embodiment employs the output voltage Vout that is lower than a voltage generated by the tertiary winding S3, to clamp the voltage generated by the tertiary winding S3 at the clamp diodes D20 to D23. The clamp diodes D20 to D23 provide voltage-clamped signals to drive the gates of the switches Q10 and Q11, i.e., the synchronous rectifiers. As a result, the ON period of the switch Q10 is extended from a range of t4 to t6 to a range of t2 to t7, thereby elongating a period to pass the current Q10i to the switch Q10. Also, the ON period of the switch Q11 is extended from a range of t9 to t1 to a range of t7 to t2, thereby elongating a period in which the current Q11i is passed to the switch Q11. Consequently, the DC converter according to the first embodiment is highly efficient.

Oscillation due to the recovery currents of the rectifying diodes D10 and D11 connected in parallel with the switches Q10 and Q11, i.e., the synchronous rectifiers never repeatedly turn on and off the switches Q10 and Q11 to cause chattering. As a result, the DC converter according to the first embodiment can stably and efficiently drive the synchronous rectifiers.

Operation of the DC converter with the clamp diode D20 involving a large amount of recovery current will be explained.

Figure 9:
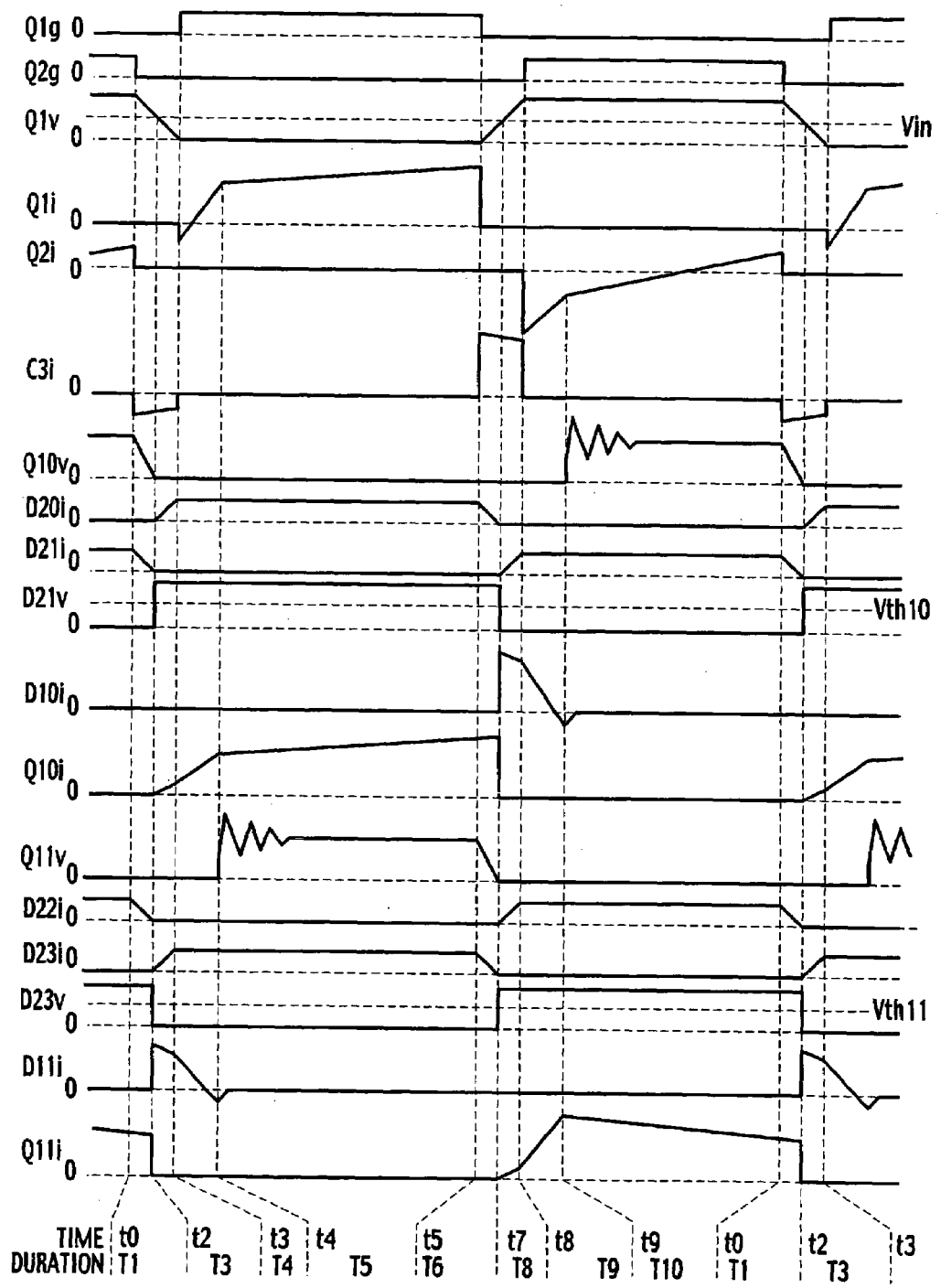
FIG. 9 is a timing chart showing signals at various parts of the DC converter according to the first embodiment.
Figure 10:
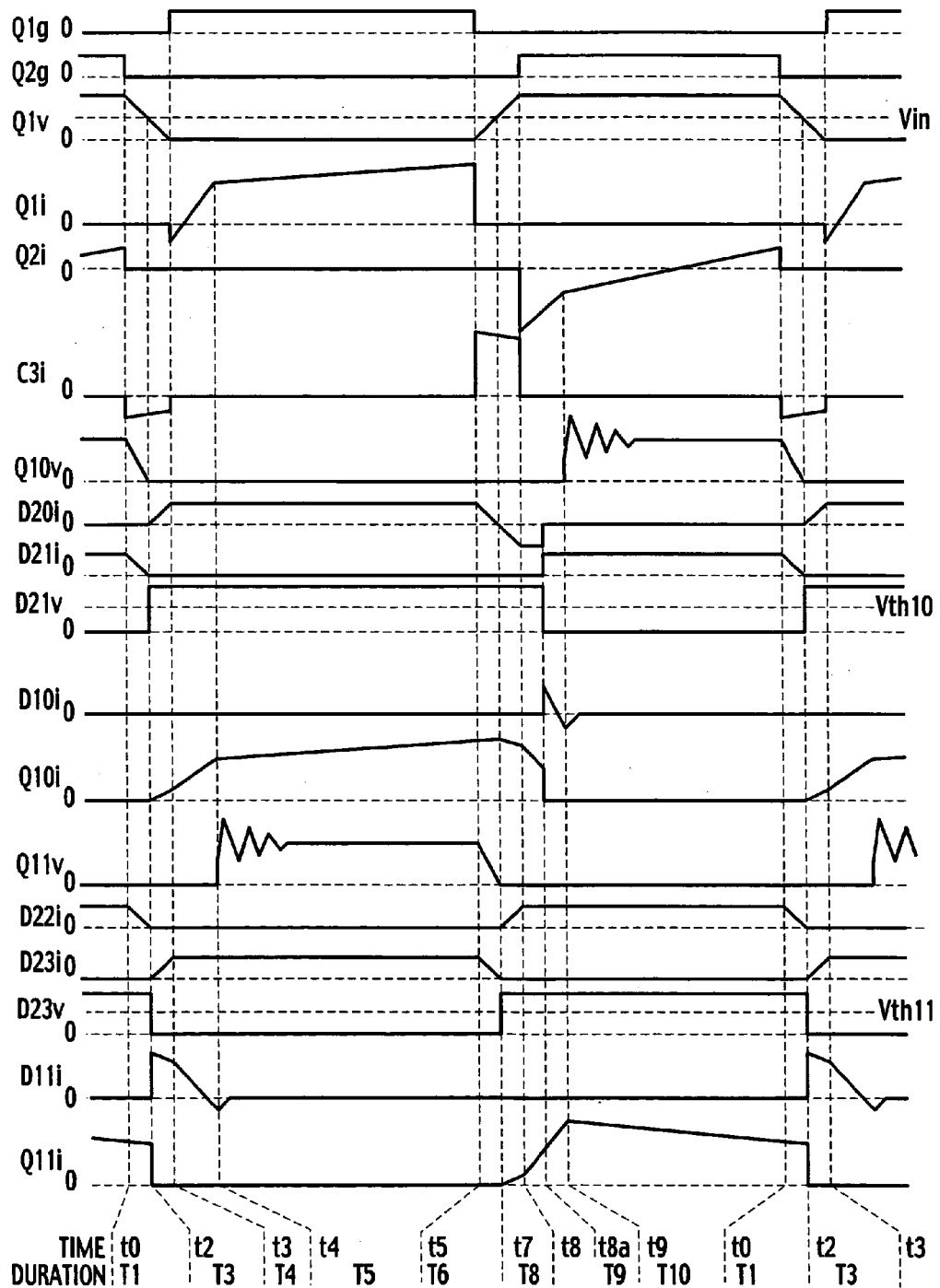
FIG. 10 is a timing chart showing signals at the various parts of FIG. 9 with a clamp diode D20 producing a large amount of recovery current.

FIG. 10 is a timing chart showing signals at different parts of the DC converter of the first embodiment shown in FIG. 8 with the clamp diode D20 involving a large amount of recovery current. With the clamp diode D20 involving a large amount of recovery current, the voltage D21v is substantially equal to the clamp voltage during a period of t7 to t8a in which the clamp diode D20 passes the recovery current. As a result, the OFF timing of the gate signal to the switch Q10 is delayed up to t8a, to extend the ON period of the switch Q10 longer than that shown in FIG. 9. This further improves the efficiency of the DC converter.

The details of operation of the DC converter with the clamp diode D20 involving a large amount of recovery current will be explained with reference to FIG. 10.

In FIG. 10, actions before t0 and in the periods T1, T3, T4, T5, T6, and T10 are the same as those shown in the timing chart of FIG. 9, and therefore, will not be explained. Operation in the periods T8 and T9 will be explained.

At t7 of the period T8, the voltage Q1v of the switch Q1 reaches a level of Vin. The terminal voltage of the primary winding P1 becomes zero and the terminal voltage of the tertiary winding S3 also becomes zero to zero the currents of the clamp diodes D20 and D23. The terminal voltage of the secondary winding S1 also becomes zero, and therefore, the voltage Q11v of the switch Q11 becomes zero. The voltage Q1v of the switch Q1 further increases to apply positive potential to the winding end of the primary winding P1. The winding end of the tertiary winding S3 also receives positive potential.

Since the clamp diode D20 involves a large amount of recovery current, the clamp diode D20 still passes the recovery current through a path along S3, D22, D20, R22, and S3. As a result, the clamp diode D22 is conductive, the voltage D23v is substantially equal to the clamp voltage, and the switch Q11 turns on. Due to the recovery current passing through the clamp diode D20, the clamp diode D21 is nonconductive, the voltage D21v is equal to the clamp voltage, and the switch Q10 is continuously ON. The winding end of the secondary winding S1 receives positive potential. At t8, the voltage Q1v of the switch Q1 reaches a level of Vin+VC2. As a result, the terminal voltage of the primary winding P1 becomes VC2 and that of the secondary winding S1 becomes a level of VC2·(n2/n1).

In the period T8, the terminal voltage of the primary winding P1 with its winding end receiving positive potential changes from zero to VC2. At this time, the terminal potential of the secondary winding S1 with its winding end receiving positive potential changes from zero to a level of VC2·(n2/n1). Accordingly, the current ILS(t) passing through the leakage inductance LS decreases according to the above-mentioned expression (11) in which VS1(t) is the terminal voltage of the secondary winding S1 and ILS (t7) is a current passing through the leakage inductance LS at t7. The current passing through the leakage inductance LS is equal to the current passing through the switch Q10, and therefore, the current Q10i of the switch Q10 decreases in the period T8. By a decrement in the current Q10i of the switch Q10, the current Q11i of the switch Q11 increases. In the period T8 on the secondary side of the transformer Tc, a current passes through the path along L1, C10, Q10, LS, S1, and L1 and another current passes through the path along L1, C10, Q11, and L1. The former current decreases according to the expression (11), and the latter current increases by the decrement of the former current.

At t8 of period T9, the capacitor C3 is completely charged, the voltage Q1v of the switch Q1 is substantially a level of Vin+VC2, and the terminal voltage of the primary winding P1 is VC2. Accordingly, the terminal voltage VS1(t) of the secondary winding S1 is a level of VC2·(n2/n1) and the current ILS(t) passing through the leakage inductance LS decreases according to the expression (12).

At t8a, the recovery current of the clamp diode D20 disappears, and the clamp diode D21 becomes conductive. The current passing through the path along S3, D22, D20, R22, and S3 changes its direction to the route of S3, D22, C10, D21, R22, and S3. As a result, the voltage D21v becomes substantially zero, the switch Q10 is turned off, and the current passing through the switch Q10 changes its direction to the diode D10. The current ILS(t) passing through the leakage inductance LS of the expression (12) is equal to the current of the switch Q10 or diode D10. Accordingly, by a decrement in the current of the switch Q10 or diode D10 according to the expression (12), the current Q11i of the switch Q11 increases. At t9, the current D10i of the diode D10 becomes zero and the current Q11i of the switch Q11 becomes equal to a current passing through the smoothing reactor L1.

The current Q2i of the switch Q2 is proportional to a current passing through the secondary winding S1 at the ratio of the numbers of turns. Namely, the current Q2i of the switch Q2 increases and becomes an excitation current of the primary winding P1 at t9.

The currents D21i and D22i of the diodes D21 and D22 passing through the path along S3, D22, C10, D21, R22, and S3 are expressed as following expression:

$$D21i = D22i = (VC2 \cdot (n4/n1) - Vout)/R22.$$

In this way, this embodiment employs the tertiary winding S3 tightly coupled with the primary winding P1, to drive the switches Q10 and Q11, i.e., the synchronous rectifiers. In addition, this embodiment employs a diode involving a large amount of recovery current as the clamp diode D20 of the DC converter of FIG. 8. The clamp diode D20 involving a large amount of recovery current enables the voltage D21v to be substantially equal to the clamp voltage during the period from t7 to t8a. This substantial clamp voltage serves as a delay signal to delay the OFF timing of the gate signal to the switch Q10 from t7 to t8a.

This results in extending the ON period of the switch Q10 longer than that of FIG. 9. Namely, the ON period of the switch Q10 is extended from the related art of t4 to t6 to the period of t2 to t8a of this embodiment. In this way, the clamp diode D20 with a large amount of recovery current can extend a period in which a current is passed through the switch Q10 serving as a synchronous rectifier.

Operation of the DC converter with both the clamp diodes D20 and D22 involving a large amount of recovery current will be explained.

Figure 11:
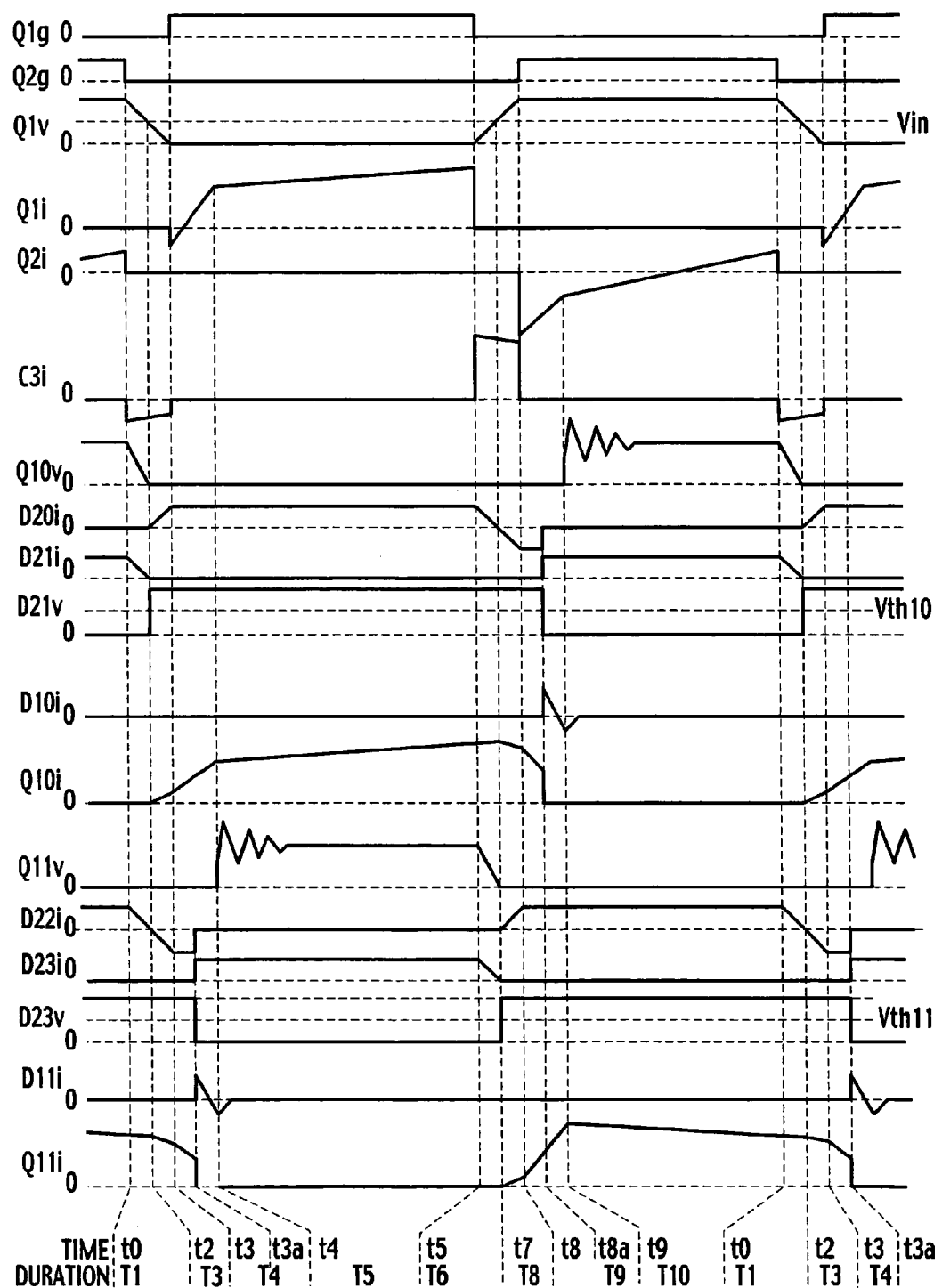
FIG. 11 is a timing chart showing signals at the various parts of FIG. 9 when clamp diodes D20 and D22 producing a large amount of recovery current.

FIG. 11 is a timing chart showing signals at different parts of the DC converter of the first embodiment shown in FIG. 8 with the clamp diodes D20 and D22 involving a large amount of recovery current. With the clamp diodes D20 and D22 involving a large amount of recovery current, the voltage D21v is substantially equal to the clamp voltage (delay signal) during a period from t7 to t8a in which the clamp diode D20 passes a recovery current, and the voltage D23v is substantially equal to the clamp voltage (delay signal) during a period from t2 to t3a in which the clamp diode D22 passes a recovery current.

This embodiment delays the OFF timing of the gate signal to the switch Q10 from t7 to t8a, and also, the OFF timing of the gate signal to the switch Q11 from t2 to t3a. This results in extending the ON periods of the switches Q10 and Q11 longer than those of FIG. 8, thereby improving the efficiency of the DC converter.

Operation of the clamp diode D22 involving a large amount of recovery current is the same as that of the clamp diode D20 involving a large amount of recovery current already explained, and therefore, the explanation thereof is omitted.

SECOND EMBODIMENT

Figure 12:
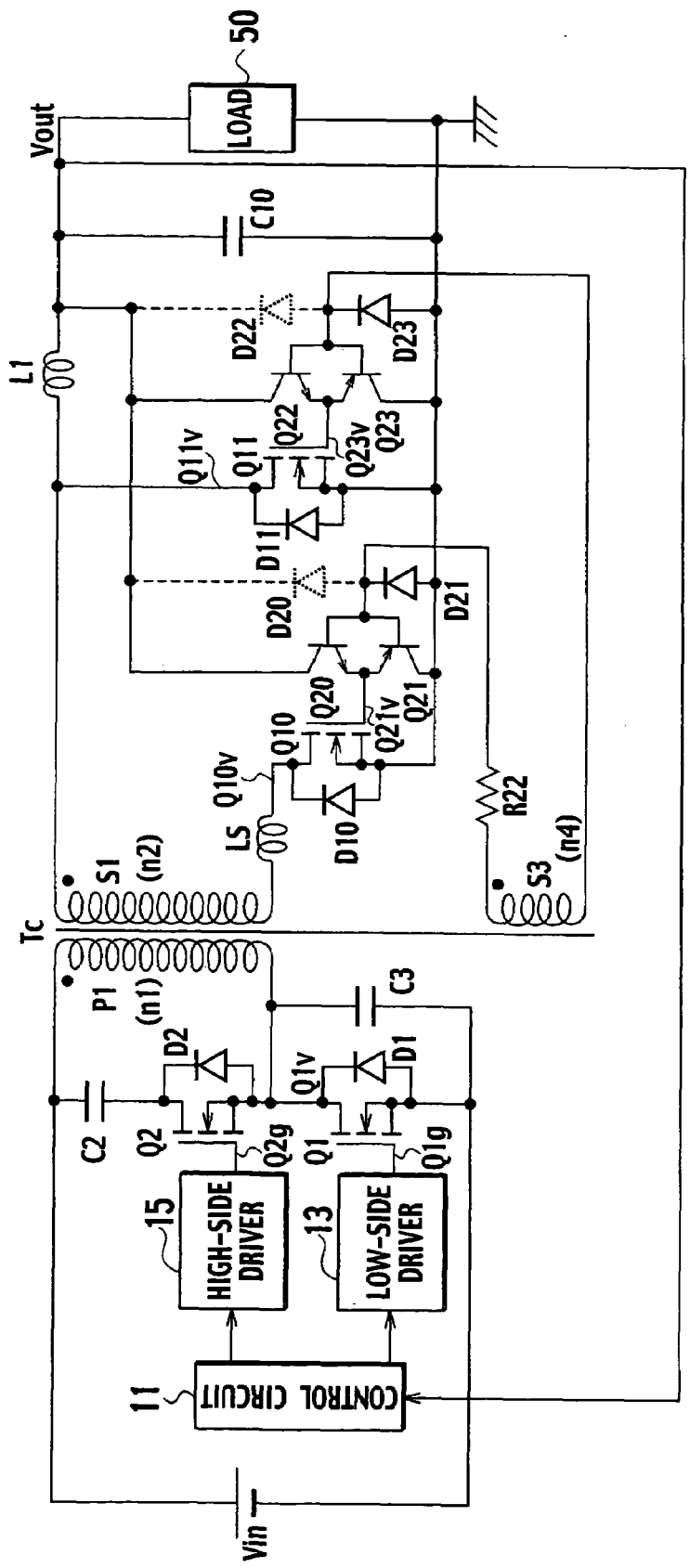
FIG. 12 is a circuit diagram showing a DC converter according to an second embodiment of the present invention.

FIG. 12 is a circuit diagram showing a DC converter according to the second embodiment of the present invention. The second embodiment of FIG. 12 employs a first buffer circuit that includes transistors Q20 and Q21 and is connected between a node between clamp diodes D20 and D21 and the gate of a switch Q10 serving as a synchronous rectifier. The second embodiment also employs a second buffer circuit that includes transistors Q22 and Q23 and is connected between a node between clamp diodes D22 and D23 and the gate of a switch Q11 serving as a synchronous rectifier.

The transistor Q20 has a base connected to the node between the clamp diodes D20 and D21, a collector connected to an output voltage Vout, and an emitter connected to the gate of the switch Q10. The transistor Q21 has a base connected to the node between the clamp diodes D20 and D21, a collector connected to the source of the switch Q10 and the anode of the clamp diode D21, and an emitter connected to the gate of the switch Q10.

The transistor Q22 has a base connected to the node between the clamp diodes D22 and D23, a collector connected to the output voltage Vout, and an emitter connected to the gate of the switch Q11. The transistor Q23 has a base connected to the node between the clamp diodes D22 and D23, a collector connected to the source of the switch Q11 and the anode of the clamp diode D23, and an emitter connected to the gate of the switch Q11.

Operational waveforms of various signals of the DC converter having the clamp diodes D20, D21, D22, and D23 are similar to those of FIG. 9, and operation of the DC converter of FIG. 12 is the same as that explained with reference to FIGS. 8 and 9. Accordingly, the explanation of operation of the DC converter according to the second embodiment is omitted.

In FIG. 12, the clamp diode D20 may be omitted. In this case, the switch Q10 turns on when the winding start of a tertiary winding S3 of a transformer Tc is at positive potential. When the switch Q11 is OFF, a current to the tertiary winding S3 passes through a path along S3, R22, Q20 (base), Q20 (collector), C10, D23, and S3.

Namely, the current passes from the base to the collector, i.e., a p-n junction of the transistor Q20. As a result, recovery is slow as if the clamp diode D20 involving a large amount of recovery current is employed. Due to this, operational waveforms of this example are the same as those of FIG. 10 with the current D20i of the clamp diode D20 of FIG. 10 being replaced with a current Ibc (Q20) of the p-n junction diode between the base and collector of the transistor Q20. Accordingly, operation of this example is the same as that explained with reference to FIG. 10.

The additional buffer circuits of the second embodiment of FIG. 12 are capable of driving the switches Q10 and Q11 even if they are of large capacity.

In FIG. 12, the clamp diodes D20 and D22 may be removed. In this case, the same operation as that with the clamp diodes D20 and D22 involving a large amount of recovery current is achieved. Namely, the same operational waveforms as those shown in FIG. 11 will be demonstrated, provided that the current D20i of the clamp diode D20 of FIG. 11 is replaced with a current Ibc (Q20) of the p-n junction diode between the base and collector of the transistor Q20 and the current D22i of the clamp diode D22 of FIG. 11 is replaced with a current Ibc (Q22) of the p-n junction diode between the base and collector of the transistor Q22. Operation of this configuration is the same as that explained with reference to FIG. 11.

THIRD EMBODIMENT

Figure 13:
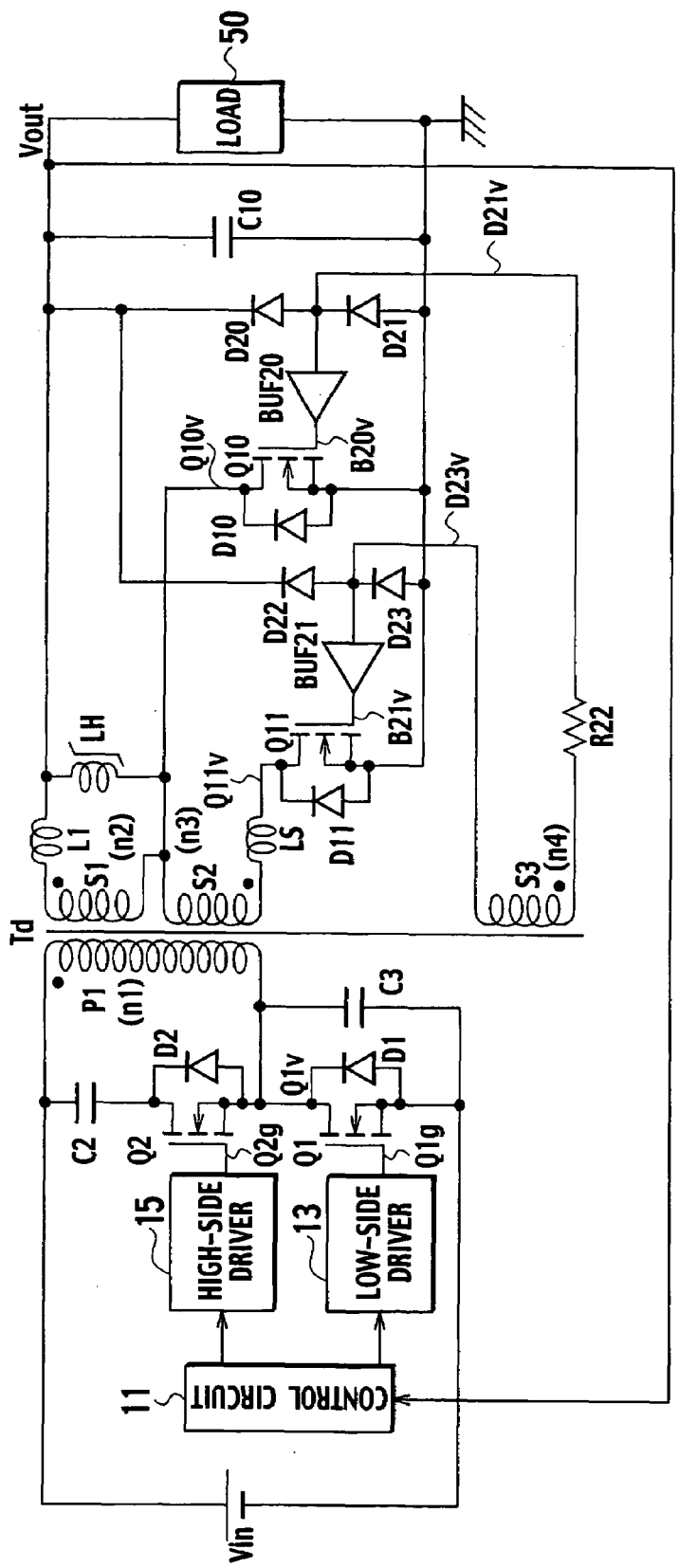
FIG. 13 is a circuit diagram showing a DC converter according to an third embodiment of the present invention.

FIG. 13 is a circuit diagram showing a DC converter according to the third embodiment of the present invention. Parts of the third embodiment that are different from those of the related art of FIG. 3 will be explained.

A transformer Td has a primary winding (having the number of turns of n1), a first secondary winding S1 (having the number of turns of n2) very loosely coupled with the primary winding P1, a second secondary winding S2 (having the number of turns of n3) loosely coupled with the primary winding P1, and a tertiary winding S3 (having the number of turns of n4) tightly coupled with the primary winding P1. The tertiary winding S3 is connected in series with a resistor R22. Ends of a smoothing capacitor C10 are connected to a series circuit of clamp diodes D20 and D21 and a series circuit of clamp diodes D22 and D23. A first end of a resistor R22 is connected to a node between the clamp diodes D20 and D21 and to the gate of a switch Q10 through a buffer circuit BUF20. A first end of the tertiary winding S3 is connected to a node between the clamp diodes D22 and D23 and to the gate of a switch Q11 through a buffer circuit BUF21. A second end of the resistor R22 is connected to a second end of the tertiary winding S3.

To turn on the switch Q10 when a switch Q1 is ON, the winding start of the tertiary winding S3 is connected through the resistor R20 and buffer circuit BUF20 to the gate of the switch Q10. To turn on the switch Q11 when the switch Q1 is OFF, the winding end of the tertiary winding S3 is connected through the buffer circuit BUF21 to the gate of the switch Q11.

The smoothing capacitor C10 provides an output voltage Vout that is lower than a voltage generated by the tertiary winding S3 and is used as a clamp voltage source. The clamp voltage source may be a separate power source.

The clamp diodes D20, D21, D22, and D23 clamp a winding voltage generated by the tertiary winding S3 at the output voltage Vout, i.e., the clamp voltage source. The resistor R22 limits a clamp current passing through the clamp diodes when the winding voltage is clamped at the clamp voltage.

Recovery currents of the clamp diodes D20, D21, D22, and D23 are used so that voltage signals clamped by the clamp diodes D20, D21, D22, and D23 may drive the gates of the switches Q10 and Q11 serving as synchronous rectifiers. This operation extends the ON period of each synchronous rectifier and improves the efficiency of synchronous rectification. More precisely, the clamp diodes D20 and D21 clamp a signal D21v that serves as a drive signal for driving the gate of the switch Q10. The clamp diodes D22 and D23 clamp a signal D23v that serves as a drive signal for driving the gate of the switch Q11.

Driving the synchronous rectifiers with the tertiary winding S3 realizes stable operation of the synchronous rectifiers and improves efficiency because the synchronous rectifiers are never repeatedly turned on and off to cause chattering due to oscillation caused by recovery currents of rectifying diodes that are connected in parallel with the synchronous rectifiers.

The tertiary winding S3 is tightly coupled with the primary winding P1, and therefore, has the same voltage waveform as that of the primary winding P1. The DC converter according to the third embodiment, therefore, can extend the ON period of each synchronous rectifier and improve the efficiency thereof. The DC converter employs the tertiary winding S3 tightly coupled with the primary winding P1, to drive the synchronous rectifiers, i.e., the switches Q10 and Q11. This prevents the synchronous rectifiers from repeatedly turning on and off to cause chattering due to oscillation caused by recovery currents of the rectifying diodes D10 and D11 connected in parallel with the synchronous rectifiers. Namely, the DC converter of this embodiment can stably drive the synchronous rectifiers and improve the efficiency thereof.

Figure 3:
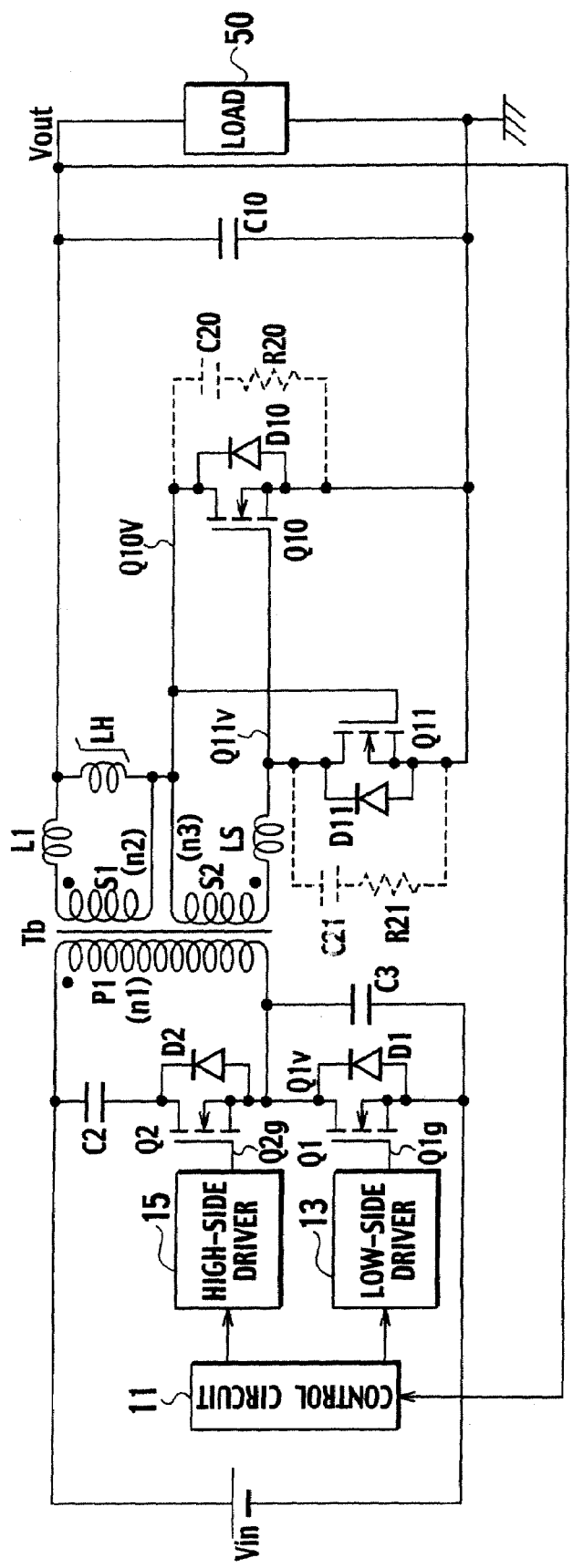
FIG. 3 is a circuit diagram showing a DC converter according to a second related art.
Figure 4:
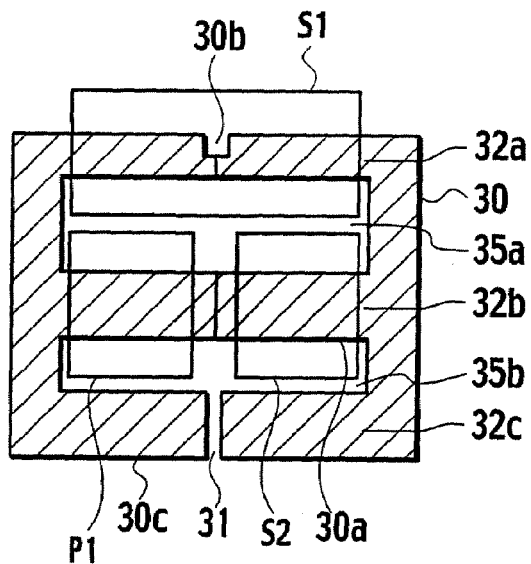
FIG. 4 is a view showing the structure of a transformer installed in the DC converter according to the second related art.
Figure 5:
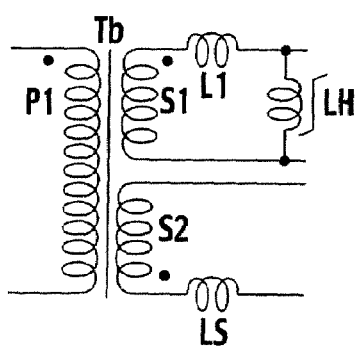
FIG. 5 is an equivalent circuit diagram showing the transformer of FIG. 4.

Compared with the DC converter of FIG. 3, the DC converter of FIG. 13 has no CR snubber circuits (the resistors R20 and R21 and capacitors C20 and C21).

Figure 14:
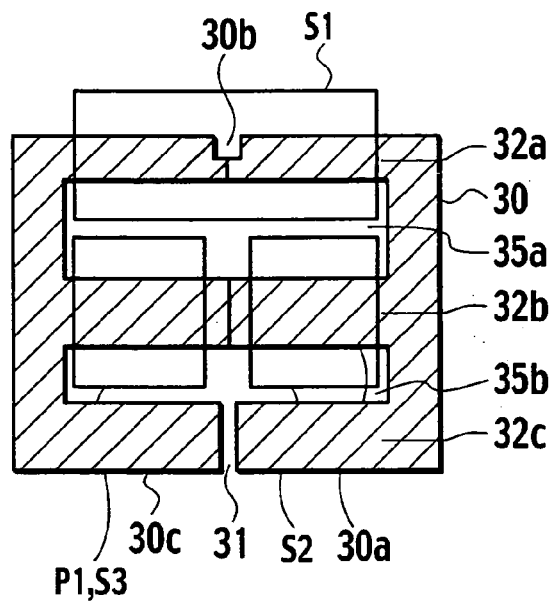
FIG. 14 is a view showing the structure of a transformer installed in the DC converter according to the third embodiment.
Figure 15:
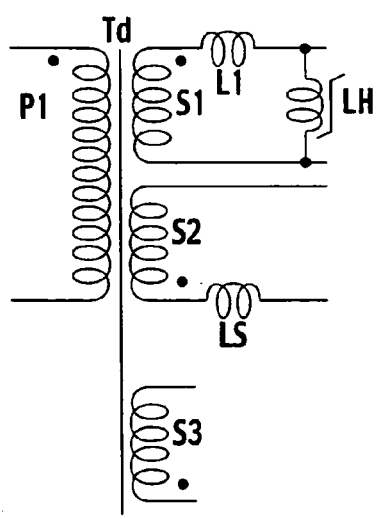
FIG. 15 is an equivalent circuit diagram showing the transformer of FIG. 14.

FIG. 14 is a view showing the structure of the transformer Td installed in the DC converter according to the third embodiment, and FIG. 15 is an equivalent circuit diagram showing the transformer of FIG. 14. In FIG. 14, the transformer Td has a core 30 having a rectangular external shape. The core 30 has spaces 35a and 35b extending in parallel to each other in a longitudinal magnetic path direction, to form magnetic paths 32a, 32b, and 32c. Around a core part 30a of the core 30, the primary winding P1, tertiary winding S3, and second secondary winding S2 are wound adjacent to each other. This produces a slight leakage inductance (LS of FIG. 15) between the primary winding P1 plus the tertiary winding S3 and the second secondary winding S2. The core 30 has a path core 30c and a gap 31. Around a peripheral core, the first secondary winding S1 is wound. The path core 30c works to very loosely couple the primary winding P1 and first secondary winding S1 with each other, thereby increasing a leakage inductance (L1 of FIG. 15).

On the peripheral core and between the primary winding P1 and the second secondary winding S2, a recess 30b is formed. The recess 30b reduces the sectional area of a part of a magnetic path of the core so that only the part may saturate. This configuration can reduce a core loss. The part that saturates is used as a saturable reactor (LH of FIG. 15). Forming the recess 30b at a part of the core 30 where the first secondary winding S1 is wound results in saturating the part, increasing an excitation current, and producing a voltage resonance.

Figure 16:
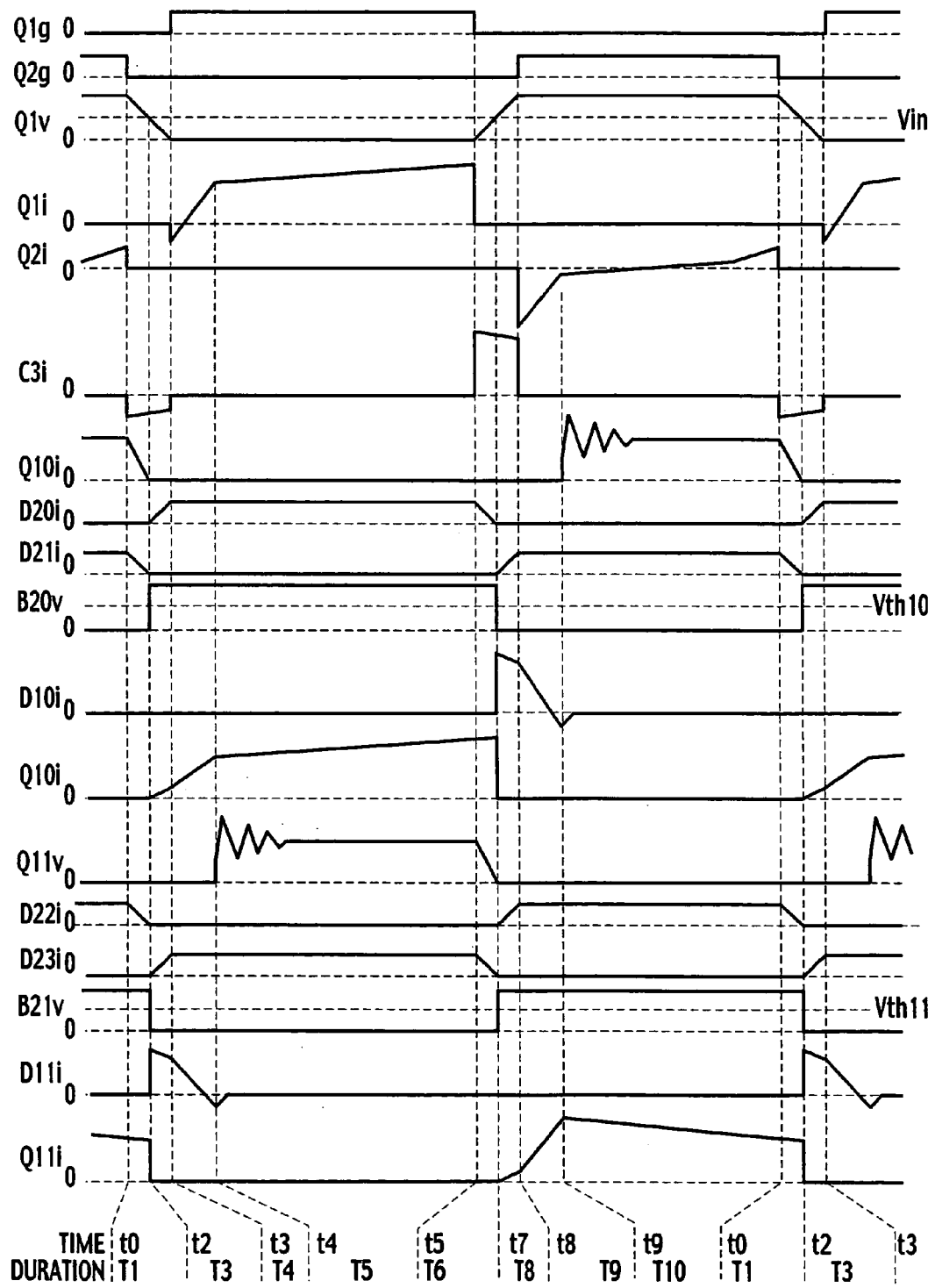
FIG. 16 is a timing chart showing signals at various parts of the DC converter according to the third embodiment.

FIG. 16 is a timing chart showing signals at various parts of the DC converter of the third embodiment. Basic operation of the third embodiment is substantially the same as that of the related art shown in FIG. 3, and operation of the tertiary winding S3 and clamp diodes D20 to D23 is substantially the same as that of the DC converter of FIG. 8. Accordingly, the detailed explanation of the operation of the third embodiment is omitted.

If the clamp diode D20 of the third embodiment involves a large amount of recovery current, operational waveforms thereof will be similar to those of FIG. 10. In this case, a period in which the clamp diode D20 passes a recovery current is from t7 to t8a. During this period, a voltage B20v of the buffer circuit BUF20 is substantially equal to the clamp voltage, to delay the OFF timing of a gate signal to the switch Q10 until t8a. As a result, the ON period of the switch Q10 is extended longer than that of FIG. 9, to further improve the efficiency of the DC converter.

If the clamp diodes D20 and D22 each involve a large amount of recovery current, operational waveforms thereof will be like those of FIG. 11. In this case, a period in which the clamp diode D20 passes a recovery current is from t7 to t8a. During this period, the voltage B20v of the buffer circuit BUF20 is substantially equal to the clamp voltage. A period in which the clamp diode D22 passes a recovery current is from t2 to t3a. During this period, a voltage B21v of the buffer circuit BUF21 is substantially equal to the clamp voltage. As a result, the OFF timing of a gate signal to the switch Q10 is delayed until t8a, and the OFF timing of a gate signal to the switch Q11 is delayed until t3a. With them, the ON periods of the switches Q10 and Q11 are extended longer than those of FIG. 9, to further improve the efficiency of the DC converter.

The buffer circuits BUF21 and BUF20 may employ transistors as shown in FIG. 12, and in addition, the clamp diode D20 may be omitted. In this case, when the winding start of the tertiary winding S3 is at positive potential, the switch Q10 is ON, the switch Q11 is OFF, a current to the tertiary winding S3 passes through a path along S3, R20, Q20 (base), Q20 (collector), C10, D23, and S3.

Since the current passes through a p-n junction of the transistor Q20 from the base to the collector thereof, recovery is slow as if the clamp diode D20 involving a large amount of recovery current is employed. In this case, the same operational waveforms as those of FIG. 10 will appear. The additional buffer circuits are effective when the synchronous rectifiers are of large capacity.

The clamp diodes D20 and D22 may be omitted. In this case, the same operation as that with the clamp diodes D20 and D22 involving a large amount of recovery current is achieved. Namely, the same operational waveforms as those of FIG. 11 will appear.

In summary, a DC converter according to the present invention employs clamp diodes that clamp a voltage generated by a tertiary winding of a transformer with the use of a voltage source that supplies a voltage lower than the voltage generated by the tertiary winding. The clamp diodes provide voltage-clamped signals to drive synchronous rectifiers. This configuration extends the ON period of each synchronous rectifier and improves the efficiency thereof.

By driving the synchronous rectifiers with the tertiary winding, the DC converter prevents the synchronous rectifiers from repeatedly turning on and off to cause chattering due to oscillation caused by recovery currents of rectifying diodes that are connected in parallel with the synchronous rectifiers. The DC converter, therefore, can operate stably and improve efficiency.

The present invention is applicable to switching power sources such as DC-DC converters and AC-DC converters.

This application claims benefit of priority under 35 USC §119 to Japanese Patent Applications No. 2005-051706, filed on Feb. 25, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC converter having a transformer including primary and secondary windings that are loosely coupled with each other, a main switch connected in series with the primary winding, and a series circuit being connected to ends of one of the primary winding and the main switch and including a clamp capacitor and an auxiliary switch, the main and auxiliary switches being alternately turned on/off so that a voltage of the secondary winding of the transformer is synchronously rectified with synchronous rectifiers and is smoothed with smoothing elements to provide a DC output, the DC converter comprising:

a tertiary winding provided for the transformer and being tightly coupled with the primary winding;

a voltage source configured to provide a voltage lower than a voltage generated by the tertiary winding; and clamp diodes configured to clamp the voltage generated by the tertiary winding with the use of the voltage source, the clamp diodes providing voltage-clamped signals to drive the synchronous rectifiers.

2. A DC converter having a transformer including a primary winding, a first secondary winding being very loosely coupled with the primary winding, and a second secondary winding being loosely coupled with the primary winding, a main switch connected in series with the primary winding, and a series circuit being connected to ends of one of the primary winding and main switch and including a clamp capacitor and an auxiliary switch, the main and auxiliary switches being alternately turned on/off so that, when energy is accumulated in a leakage inductance between the primary winding and the first secondary winding when the main switch is ON, the accumulated energy being transferred through the second secondary winding to a secondary side of the transformer when the main switch is OFF, a voltage of the secondary windings being synchronously rectified with synchronous rectifiers and smoothed with smoothing elements to provide a DC output, the DC converter comprising:

a tertiary winding provided for the transformer and being tightly coupled with the primary winding;

a voltage source configured to provide a voltage lower than a voltage generated by the tertiary winding; and clamp diodes configured to clamp the voltage generated by the tertiary winding with the use of the voltage source, the clamp diodes providing voltage-clamped signals to drive the synchronous rectifiers.

3. The DC converter of claim 1, further comprising a current limiting resistor configured to limit a current passing through the clamp diodes.

4. The DC converter of claim 2, further comprising a current limiting resistor configured to limit a current passing through the clamp diodes.

5. The DC converter of claim 1, wherein:

the clamp diodes pass recovery currents to generate delay signals that are delayed behind the voltage generated by the tertiary winding; and the delay signals are used to drive the synchronous rectifiers.

6. The DC converter of claim 2, wherein:

the clamp diodes pass recovery currents to generate delay signals that are delayed behind the voltage generated by the tertiary winding; and the delay signals are used to drive the synchronous rectifiers.

7. The DC converter of claim 1, wherein the clamp diodes are p-n junctions of transistors to generate delay signals that are delayed behind the voltage generated by the tertiary winding and are used to drive the synchronous rectifiers.

8. The DC converter of claim 2, wherein the clamp diodes are p-n junctions of transistors to generate delay signals that are delayed behind the voltage generated by the tertiary winding and are used to drive the synchronous rectifiers.

9. The DC converter of claim 1, wherein the voltage source is the DC output.

10. The DC converter of claim 2, wherein the voltage source is the DC output.

\* \* \* \* \*